(12) United States Patent
Kamamoto et al.

(10) Patent No.: US 10,138,939 B2
(45) Date of Patent: Nov. 27, 2018

(54) TAPER ROLLER BEARING

(71) Applicant: JTEKT CORPORATION, Osaka-shi, Osaka (JP)

(72) Inventors: Shigeo Kamamoto, Kashiwara (JP); Junji Murata, Kashiba (JP); Yuki Shishihara, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/515,762

(22) PCT Filed: Oct. 23, 2015

(86) PCT No.: PCT/JP2015/079916
§ 371 (c)(1),
(2) Date: Mar. 30, 2017

(87) PCT Pub. No.: WO2016/068027
PCT Pub. Date: May 6, 2016

(65) Prior Publication Data
US 2017/0298989 A1    Oct. 19, 2017

(30) Foreign Application Priority Data

Oct. 29, 2014   (JP) ................................. 2014-220319

(51) Int. Cl.
*F16C 33/66*    (2006.01)
*F16C 33/36*    (2006.01)
(Continued)

(52) U.S. Cl.
CPC .......... *F16C 33/366* (2013.01); *F16C 19/364* (2013.01); *F16C 33/1085* (2013.01);
(Continued)

(58) Field of Classification Search
CPC . F16C 33/366; F16C 33/4605; F16C 33/4617
See application file for complete search history.

(56) References Cited

U.S. PATENT DOCUMENTS

| | | |
|---|---|---|
| 1,840,607 A | 1/1932 | Scribner |
| 3,477,773 A | 11/1969 | Altson et al. |

(Continued)

FOREIGN PATENT DOCUMENTS

| | | |
|---|---|---|
| AU | 2010212394 A1 | 3/2011 |
| CN | 101725634 A | 6/2010 |

(Continued)

OTHER PUBLICATIONS

Jan. 25, 2018 Office Action Issued in U.S. Appl. No. 15/516,564.
(Continued)

*Primary Examiner* — Thomas R Hannon
(74) *Attorney, Agent, or Firm* — Oliff PLC

(57) ABSTRACT

A taper roller bearing includes: an inner ring, an outer ring, a plurality of taper rollers, and an annular cage which holds the plurality of taper rollers at an interval in the circumferential direction. The cage includes a small-diameter annular portion on one axial side, a large-diameter annular portion on the other axial side, and a plurality of column portions. An inner circumferential surface of the small-diameter annular portion includes a first inner circumferential surface portion and a second inner circumferential surface portion having a small diameter. An outer circumferential surface of the small flange included in the inner ring includes a first outer circumferential surface portion which opposes the first inner circumferential surface portion having a fine clearance, and a second outer circumferential surface portion which has a small diameter and opposes the second inner circumferential surface portion having a fine clearance.

7 Claims, 19 Drawing Sheets

(51) Int. Cl.
*F16C 19/36* (2006.01)
*F16C 33/46* (2006.01)
*F16C 33/10* (2006.01)

(52) U.S. Cl.
CPC ...... *F16C 33/4605* (2013.01); *F16C 33/4617* (2013.01); *F16C 33/4635* (2013.01); *F16C 33/4676* (2013.01); *F16C 33/6674* (2013.01); *F16C 33/6681* (2013.01); *F16C 33/664* (2013.01); *F16C 2220/04* (2013.01); *F16C 2240/46* (2013.01); *F16C 2300/02* (2013.01)

(56) References Cited

U.S. PATENT DOCUMENTS

| | | | |
|---|---|---|---|
| 4,288,129 | A | 9/1981 | Ryanen |
| 4,425,011 | A | 1/1984 | Cunningham et al. |
| 4,462,643 | A | 7/1984 | Gilbert et al. |
| 4,664,537 | A | 5/1987 | Ascheron et al. |
| 4,707,152 | A | 11/1987 | Neese |
| 4,728,204 | A | 3/1988 | Colanzi et al. |
| 5,039,231 | A | 8/1991 | Kispert et al. |
| 7,955,001 | B2 | 6/2011 | Reed et al. |
| 8,172,464 | B2 | 5/2012 | Matsushita |
| 8,382,380 | B2 | 2/2013 | Nakamizo et al. |
| 8,480,308 | B2 * | 7/2013 | Masuda ............ F16C 19/225 384/564 |
| 8,596,877 | B2 | 12/2013 | Kanbori et al. |
| 8,641,290 | B2 * | 2/2014 | Kawaguchi ........ F16C 19/364 384/450 |
| 8,770,853 | B2 | 7/2014 | Miyachi |
| 8,783,965 | B2 | 7/2014 | Tsujimoto |
| 9,039,288 | B2 | 5/2015 | Takeuchi et al. |
| 9,297,419 | B2 | 3/2016 | Suzuki |
| 9,664,230 | B2 | 5/2017 | Kamamoto et al. |
| 2007/0230852 | A1 | 10/2007 | Tabata et al. |
| 2008/0205813 | A1 | 8/2008 | Sada et al. |
| 2010/0098369 | A1 | 4/2010 | Reed et al. |
| 2010/0209036 | A1 | 8/2010 | Ueno |
| 2011/0123142 | A1 | 5/2011 | Mason et al. |
| 2011/0142389 | A1 | 6/2011 | Takeuchi et al. |
| 2012/0263405 | A1 | 10/2012 | Mizuki et al. |
| 2012/0321237 | A1 | 12/2012 | Usuki et al. |
| 2013/0315522 | A1 | 11/2013 | Miyachi |
| 2014/0013603 | A1 | 1/2014 | Miyachi |
| 2014/0248018 | A1 | 9/2014 | Omoto et al. |
| 2015/0049971 | A1 | 2/2015 | Dittmar et al. |
| 2015/0323008 | A1 | 11/2015 | Koganei et al. |
| 2016/0040716 | A1 | 2/2016 | Koganei et al. |
| 2016/0169285 | A1 * | 6/2016 | Furusawa ......... F16C 33/7813 384/484 |

FOREIGN PATENT DOCUMENTS

| | | |
|---|---|---|
| CN | 102089541 A | 6/2011 |
| CN | 203892379 U | 10/2014 |
| FR | 2548297 A1 | 1/1985 |
| JP | S55-010140 A | 1/1980 |
| JP | S62-200019 A | 9/1987 |
| JP | H01-085521 U | 6/1989 |
| JP | H03-69823 A | 3/1991 |
| JP | H05-058956 U | 3/1993 |
| JP | 2745160 B2 | 4/1998 |
| JP | 2003-287033 A | 10/2003 |
| JP | 2005-321049 A | 11/2005 |
| JP | 3751739 B2 | 3/2006 |
| JP | 2008-002534 A | 1/2008 |
| JP | 2008-014335 A | 1/2008 |
| JP | 2008-051272 A | 3/2008 |
| JP | 2008-051295 A | 3/2008 |
| JP | 2008-169995 A | 7/2008 |
| JP | 2008-208973 A | 9/2008 |
| JP | 4151347 B2 | 9/2008 |
| JP | 2008-249104 A | 10/2008 |
| JP | 2009-192069 A | 8/2009 |
| JP | 2009-204068 A | 9/2009 |
| JP | 2011-226571 A | 11/2011 |
| JP | 2012-047250 A | 3/2012 |
| JP | 2013-238296 A | 11/2013 |
| JP | 2013-242018 A | 12/2013 |
| JP | 5429166 B2 | 2/2014 |
| JP | 2014-202284 A | 10/2014 |
| JP | 2014-202341 A | 10/2014 |
| WO | 2014-175000 A1 | 10/2014 |
| WO | 2014163177 A1 | 10/2014 |

OTHER PUBLICATIONS

Jan. 19, 2016 International Search Report issued in International Patent Application No. PCT/JP2015/079915.
Jan. 19, 2016 International Search Report issued in International Patent Application No. PCT/JP2015/079916.
Jan. 19, 2016 International Search Report issued in International Patent Application No. PCT/JP2015/079920.
Jan. 19, 2016 International Search Report issued in International Patent Application No. PCT/JP2015/079919.
Dec. 8, 2015 International Search Report issued in International Patent Application No. PCT/JP2015/079917.
Jan. 26, 2016 International Search Report issued in International Patent Application No. PCT/JP2015/079918.
U.S. Appl. No. 15/516,813, filed Apr. 4, 2017 in the name of Kamamoto et al.
U.S. Appl. No. 15/516,226, filed Mar. 31, 2017 in the name of Kamamoto et al.
U.S. Appl. No. 15/517,271, filed Apr. 6, 2017 in the name of Kamamoto et al.
U.S. Appl. No. 15/516,564, filed Apr. 3, 2017 in the name of Kamamoto et al.
U.S. Appl. No. 15/515,234, filed Mar. 29, 2017 in the name of Kamamoto et al.
Dec. 4, 2017 Office Action issued in U.S. Appl. No. 15/515,234.
Mar. 30, 2018 Office Action issued in U.S. Appl. No. 15/516,226.
Apr. 3, 2018 Office Action issued in U.S. Appl. No. 15/516,813.
Apr. 11, 2018 Office Action issued in U.S. Appl. No. 15/515,234.
Apr. 13, 2018 Office Action issued in U.S. Appl. No. 15/517,271.
Aug. 6, 2018 Office Action issued in U.S. Appl. No. 15/516,226.
Aug. 8, 2018 Office Action issued in Chinese Patent Application No. 201580058561.X.
Aug. 1, 2018 Office Action issued in Chinese Patent Application No. 201580058940.9.
Aug. 1, 2018 Office Action issued in Chinese Patent Application No. 201580058939.6.
Sep. 26, 2018 Office Action issued in U.S. Appl. No. 15/515,234.

* cited by examiner (A)

(B)

(A)

(B)

TAPER ROLLER BEARING

TECHNICAL FIELD

The present invention relates to a taper roller bearing.

BACKGROUND ART

A taper roller bearing has a larger load capacity compared to another rolling bearing having the same size and has high rigidity.

FIG. 19 is a longitudinal sectional view illustrating a taper roller bearing 100 of the related art. The taper roller bearing 100 includes an inner ring 101, an outer ring 102, a plurality of taper rollers 103 which are provided between the inner ring 101 and the outer ring 102, and an annular cage 104 which holds the taper rollers 103 at an interval in the circumferential direction (for example, refer to Patent Document 1).

The cage 104 includes a small-diameter annular portion 105 on one axial side, a large-diameter annular portion 106 on the other axial side, and a plurality of column portions 107 which link the annular portions 105 and 106 to each other. In addition, a space formed between both of the annular portions 105 and 106 and between the column portions 107 and 107 adjacent to each other in the circumferential direction is a pocket 108 which accommodates the taper roller 103 therein.

In addition, in the taper roller bearing 100, a diameter of an inner circumferential surface of the outer ring 102 widens as approaching the other side from one axial side, and when the taper roller bearing 100 (for example, inner ring 101) rotates, an action (pump action) by which the lubricating oil flows from one axial side to the other side between the outer ring 102 and the inner ring 101 is generated. It is known that, by the pump action which follows the rotation of the taper roller bearing 100, the lubricating oil on the outside of the bearing flows to the inside of the bearing from one axial side, and flows out from the other axial side.

PRIOR ART DOCUMENTS

Patent Document

[Patent Document 1] JP-B-4151347

SUMMARY OF INVENTION

Technical Problem

In general, rotation torque of the taper roller bearing tends to increase compared to that of a ball bearing. Torque loss of the taper roller bearing is mainly broadly classified into three including rolling viscosity resistance between raceway rings (the inner ring 101 and the outer ring 102) and the taper roller 103, agitating resistance of the lubricating oil on the inside of the bearing, and sliding friction resistance between the taper roller 103 and a large flange 101b included in the inner ring 101.

Therefore, it is possible to reduce the rotation torque in the taper roller bearing when at least one resistance among these is reduced.

Here, an object of the present invention is to reduce the rotation torque of the taper roller bearing.

Solution to Problem

According to the present invention, a taper roller bearing includes: an inner ring which includes a small flange that is positioned on one side in an axial direction and protrudes to an outer side in a radial direction, and a large flange that is positioned on the other axial side and protrudes to the outer side in the radial direction; an outer ring which is positioned on the outer side in the radial direction of the inner ring; a plurality of taper rollers which are positioned between the inner ring and the outer ring; and an annular cage which holds the plurality of taper rollers at an interval in the circumferential direction, in which the cage includes a small-diameter annular portion which is disposed on the one side, a large-diameter annular portion which is disposed on the other side, and a plurality of column portions which link the small-diameter annular portion and the large-diameter annular portion to each other, in which an inner circumferential surface of the small-diameter annular portion includes a first inner circumferential surface portion and a second inner circumferential surface portion having a diameter that is smaller than a diameter of the first inner circumferential surface portion, and in which an outer circumferential surface of the small flange includes a first outer circumferential surface portion opposing to the first inner circumferential surface portion with a fine clearance, and a second outer circumferential surface portion having a diameter that is smaller than a diameter of the first outer circumferential surface portion and opposing to the second inner circumferential surface portion with a fine clearance.

A diameter of the second inner circumferential surface portion is set to be larger than an outer diameter of a circular portion positioned in a shaft to which the inner ring is externally fitted, which is a value based on the ISO standard.

According to the present invention, an inner ring which includes a small flange that is positioned on one side in an axial direction and protrudes to an outer side in a radial direction and a large flange that is positioned on the other axial side and protrudes to the outer side in the radial direction; an outer ring which is positioned on the outer side in the radial direction of the inner ring; a plurality of taper rollers which are positioned between the inner ring and the outer ring; and an annular cage which holds the plurality of taper rollers at an interval in the circumferential direction, in which the cage includes a small-diameter annular portion which is positioned on the one side and on the outer side in the radial direction of the small flange, a large-diameter annular portion which is positioned on the other side, and a plurality of column portions which link the small-diameter annular portion and the large-diameter annular portion to each other, and in which a clearance in the radial direction between the small flange and the small-diameter annular portion is set to be a negative clearance or a zero clearance.

The small-diameter annular portion may be made of a material having wear resistance lower than that of the small flange.

An outer circumferential surface of the small flange may be a coarse surface.

According to the present invention, a taper roller bearing includes: an inner ring which includes a small flange that is positioned on one axial side and protrudes to an outer side in a radial direction and a large flange that is positioned on the other axial side and protrudes to the outer side in the radial direction; an outer ring which is positioned on the outer side in the radial direction of the inner ring; a plurality of taper rollers which are positioned between the inner ring and the outer ring; and an annular cage which holds the plurality of taper rollers at an interval in the circumferential direction, in which the cage includes a small-diameter annular portion which is positioned on one side, a large-diameter annular portion which is positioned on the other side and on the outer side in the radial direction of the large flange, and a plurality of column portions which link the small-diameter annular portion and the large-diameter annular portion to each other, and in which a clearance in the radial direction between the large flange and the large-diameter annular portion is set to be a negative clearance or a zero clearance.

In the taper roller bearing, the large-diameter annular portion may be made of a material having wear resistance lower than that of the large flange. An outer circumferential surface of the large flange may be a coarse surface.

Advantageous Effects of Invention

According to the present invention, it is possible to form a labyrinth structure having a clearance having different steps between the small flange of the inner ring which is an inflow side of the lubricating oil and the small-diameter annular portion of the cage. Therefore, it is possible to suppress the inflow of the lubricating oil to the inside of the bearing on the inner ring side of an annular opening portion formed between the outer ring and the small flange of the inner ring, to reduce rolling viscosity resistance and agitating resistance by reducing the amount of lubricating oil on the inside of the bearing, and to reduce the rotation torque of the taper roller bearing.

In this case, it is possible to provide the labyrinth structure on the small flange side of the inner ring while maintaining the shape of the bearing based on the ISO standard. In addition, an outer diameter (maximum value) of the circular portion is determined in accordance with the size of the taper roller bearing.

According to the present invention, when the taper roller bearing rotates, the taper roller rolls on the outer circumferential surface of the inner ring and on the inner circumferential surface of the outer ring, and accordingly, since the cage also rotates with respect to the inner ring and the outer ring, as the radial clearance between the small flange of the inner ring and the small-diameter annular portion of the cage is set to be a negative clearance or a zero clearance, sliding is performed therebetween, wear is generated, and the fine clearance is automatically formed between the small flange and the small-diameter annular portion. Accordingly, the labyrinth structure is formed between the small flange which is the inflow side of the lubricating oil and the small-diameter annular portion, and it is possible to suppress the inflow of the lubricating oil to the inside of the bearing, to reduce rolling viscosity resistance and agitating resistance by reducing the amount of lubricating oil on the inside of the bearing, and to reduce the rotation torque of the taper roller bearing.

According to the present invention, for example, the cage may be made of a resin, the inner ring may be made of steel, and accordingly, the small-diameter annular portion of the cage is worn out, and the labyrinth structure is automatically formed.

According to the present invention, since the outer circumferential surface of the small flange is a coarse surface, it is possible to promote the wear by the sliding, and the labyrinth structure is automatically formed.

According to the present invention, when the taper roller bearing rotates, the taper roller rolls on the outer circumferential surface of the inner ring and on the inner circumferential surface of the outer ring, and accordingly, since the cage also rotates with respect to the inner ring and the outer ring, as the radial clearance between the large flange of the inner ring and the large-diameter annular portion of the cage is set to be a negative clearance or a zero clearance, sliding is performed therebetween, wear is generated, and the fine clearance is automatically formed between the large flange and the large-diameter annular portion. Accordingly, the labyrinth structure is formed between the large flange which is the outflow side of the lubricating oil and the large-diameter annular portion. As a result, it is possible to suppress the outflow of the lubricating oil from a space between the large flange and the large-diameter annular portion, to supply the lubricating oil to a space between a flange surface of the large flange and a large end surface of the taper roller, and to reduce sliding friction resistance between the large flange and the taper roller. Accordingly, it is possible to reduce the rotation torque of the taper roller bearing.

According to the present invention, it is possible to reduce the rotation torque of the taper roller bearing, and accordingly, it is possible to reduce energy loss in an apparatus in which the taper roller bearing is used.

DESCRIPTION OF EMBODIMENTS

[Entire Configuration of Taper Roller Bearing]

Figure 1:
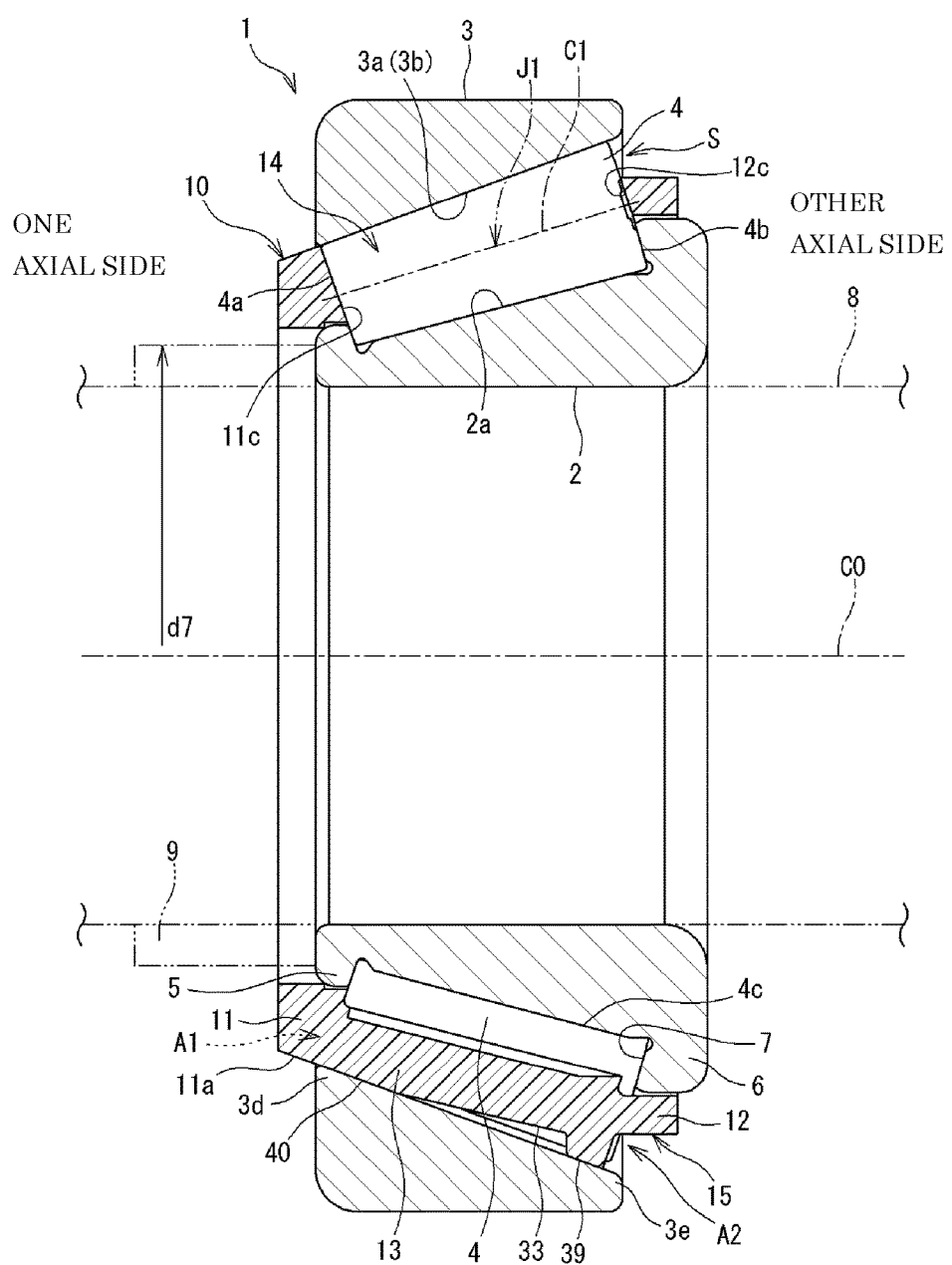
FIG. 1 is a longitudinal sectional view illustrating an embodiment of a taper roller bearing.

FIG. 1 is a longitudinal sectional view illustrating an embodiment of a taper roller bearing 1. The taper roller bearing 1 includes an inner ring 2, an outer ring 3 which is provided on a radial outer side of the inner ring 2, a plurality of taper rollers 4 which are provided between the inner ring 2 and the outer ring 3, and an annular cage 10 which holds the taper rollers 4. In addition, the taper roller bearing 1 is lubricated by lubricating oil (oil).

The inner ring 2 is an annular member which is formed by using bearing steel or steel for a mechanical structure, and a tapered inner ring raceway surface 2a on which the plurality of taper rollers 4 roll is formed on an outer circumference of the inner ring 2. In addition, the inner ring 2 includes a small flange 5 which protrudes to the radial outer side provided on one axial side (left side in FIG. 1) of the inner ring raceway surface 2a, and a large flange 6 which protrudes to the radial outer side provided on the other axial side (right side in FIG. 1) of the inner ring raceway surface 2a.

Similar to the inner ring 2, the outer ring 3 is also an annular member formed by using bearing steel or steel for a mechanical structure, and a tapered outer ring raceway surface 3a which opposes the inner ring raceway surface 2a and on which the plurality of taper rollers 4 roll is formed on an inner circumference of the outer ring 3. The raceway surfaces 2a and 3a are super-finished (finishing processing).

The taper roller 4 is a member formed by using bearing steel, and rolls on the inner ring raceway surface 2a and on the outer ring raceway surface 3a. The taper roller 4 includes a small end surface 4a having a small diameter on one axial side, and a large end surface 4b having a large diameter on the other axial side. The large end surface 4b is super-finished (finishing processing) after slidably coming into contact with a flange surface 7 of the large flange 6. In addition, the flange surface 7 is also super-finished (finishing processing).

Figure 2:
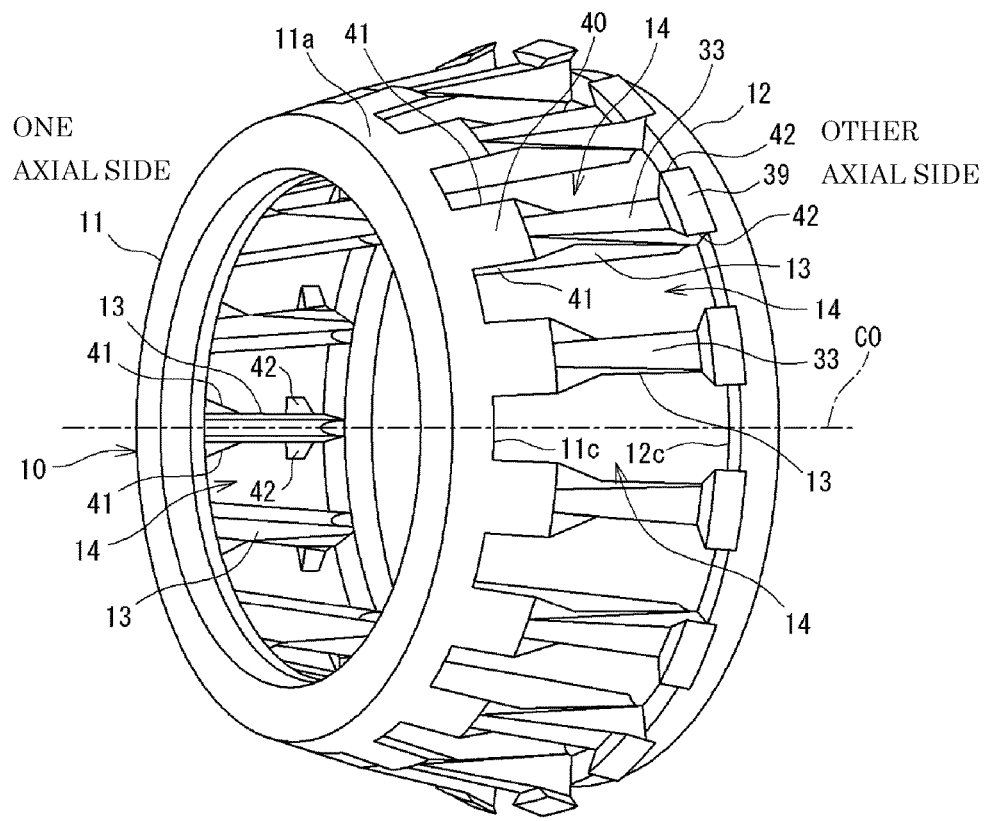
FIG. 2 is a perspective view of a cage.

FIG. 2 is a perspective view of the cage 10. In FIGS. 1 and 2, the cage 10 includes a small-diameter annular portion 11 on one axial side, a large-diameter annular portion 12 on the other axial side, and a plurality of column portions 13. The small-diameter annular portion 11 and the large-diameter annular portion 12 are annular, and are provided to be separated at a predetermined interval in the axial direction. The column portion 13 is provided at an interval in the circumferential direction, and links the annular portions 11 and 12. A space which is formed between the two column portions 13 and 13 adjacent to each other in the circumferential direction, that is, between both of the annular portions 11 and 12 is a pocket 14 which accommodates (holds) the taper roller 4 therein. The cage 10 of the embodiment is made of a resin (made of a synthetic resin) formed by injection molding that uses a half-split mold (51 and 52, refer to FIG. 15) that will be described later, and for example, the cage 10 can be made of a polyphenylene sulfide resin (PPS) or the like, and can be made of a fiber-reinforced resin (FRP).

In FIG. 1, the cage 10 is provided in an annular space S (hereinafter, also referred to as the inside of a bearing) which is formed between the inner ring 2 and the outer ring 3, accommodates one taper roller 4 in each pocket 14, and holds the plurality of taper rollers 4 being disposed at an equivalent interval in the circumferential direction. In addition, the small-diameter annular portion 11 is positioned on the radial outer side of the small flange 5 of the inner ring 2, and the large-diameter annular portion 12 is positioned on the radial outer side of the large flange 6 of the inner ring 2.

In FIG. 1, in the cage 10, axial inner surfaces 11c and 12c which face the pocket 14 side of both of the annular portions 11 and 12 can come into contact with the small end surface 4a and the large end surface 4b of the taper roller 4 (refer to FIG. 1), and accordingly, the axial movement of the cage 10 is regulated. In the embodiment, in particular, the axial movement of the cage 10 is regulated as the axial inner surface 12c comes into contact with the large end surface 4b. In other words, the cage 10 is positioned with respect to the axial direction as the annular portions 11 and 12 come into contact with the taper roller 4. Since the finishing processing, such as polishing, is performed with respect to the large end surface 4b and accuracy is high, the cage 10 is positioned with high accuracy.

In addition, the cage 10 is positioned with respect to the radial direction as a part thereof (slide contact surfaces 40 and 39) slidably comes into contact with an inner circumferential surface 3b of the outer ring 3. A configuration for this will be described. In FIG. 2, the cage 10 includes a first roller retaining portion 41 and a second roller retaining portion 42 which are formed to be integrated with the column portion 13. A part (part on the small-diameter annular portion 11 side) of the radial outer surface of the column portion 13 and the radial outer surface of the first roller retaining portion 41 are smoothly continuous arc surfaces. In addition, the other part (part on the large-diameter annular portion 12 side) of the radial outer surface of the column portion 13 and the radial outer surface of the second roller retaining portion 42 are smoothly continuous arc surfaces. The arc surfaces have a shape along a virtual taper surface having a diameter which is slightly smaller than that of the inner circumferential surface 3b of the outer ring 3, and the arc surfaces are the slide contact surfaces 40 and 39 which can slidably come into contact with the inner circumferential surface 3b of the outer ring 3. The slide contact surfaces 40 and 39 are positioned with respect to the radial direction of the cage 10 by slidably coming into contact with the inner circumferential surface 3b of the outer ring 3. In addition, the shape and other functions of the roller retaining portions 41 and 42 will be described later. In addition, in the slide contact surface 40, a part of an outer circumferential surface 11a of the small-diameter annular portion 11 is also included.

In FIG. 1, in the taper roller bearing 1, a diameter of the inner circumferential surface 3b of the outer ring 3 is enlarged from one axial side to the other side. Therefore, when the taper roller bearing 1 (inner ring 2 in the embodiment) rotates, an action (pump action) by which the lubricating oil flows from one axial side to the other side in the annular space S formed between the inner ring 2 and the outer ring 3 is generated. By the pump action which follows the rotation of the taper roller bearing 1, the lubricating oil on the outside of the bearing flows into the annular space S (inside of the bearing) between the inner ring 2 and the outer ring 3 from one axial side, and flows out from the other axial side. In other words, the lubricating oil passes through the inside of the bearing. Above, in the taper roller bearing 1 illustrated in FIG. 1, one axial side becomes an inflow side of the lubricating oil, and the other axial side becomes an outflow side of the lubricating oil.

[Regarding Small-Diameter Annular Portion 11 of Cage 10]

Figure 3:
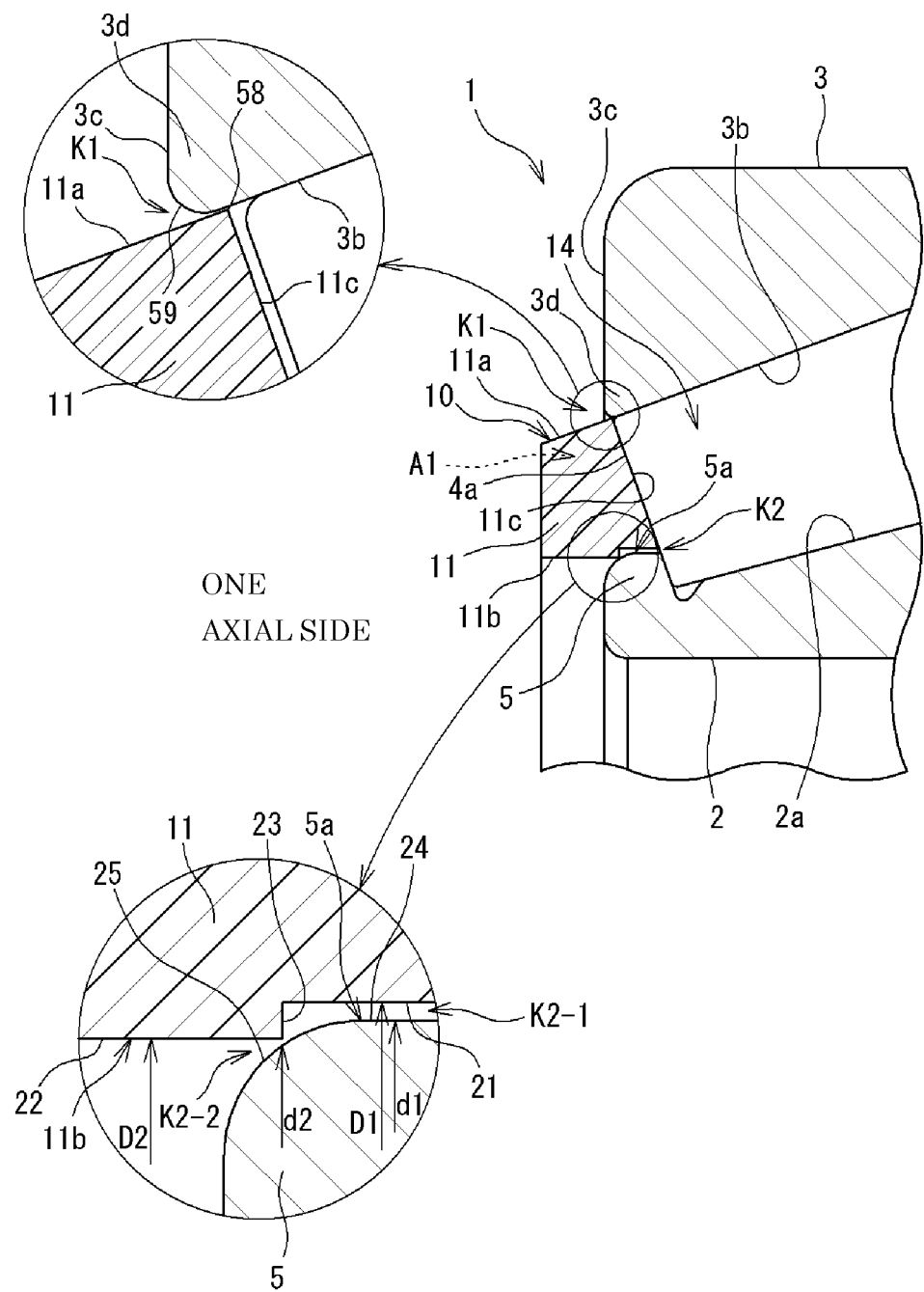
FIG. 3 is a sectional view describing a small-diameter annular portion and the periphery thereof.

FIG. 3 is a sectional view describing the small-diameter annular portion 11 and the periphery thereof. On an outer circumferential side of the small-diameter annular portion 11, an angle portion 58 in which the outer circumferential surface 11a and the axial inner surface 11c of the small-diameter annular portion 11 intersect with each other is formed. In addition, an angle portion (angle portion having a small R) 59 in which a side surface 3c and an inner circumferential surface 3b of the outer ring 3 intersect with each other is formed. A tip end of the angle portion 58 of the small-diameter annular portion 11 is in the vicinity of the angle portion 59 of the outer ring 3, and is positioned further on the inside of the bearing than the angle portion 59 of the outer ring 3. Accordingly, an annular fine clearance K1 is formed between the small-diameter annular portion 11 and an end portion 3d of the outer ring 3.

On the inner circumferential side of the small-diameter annular portion 11, an inner circumferential surface 11b of the small-diameter annular portion 11 opposes an outer circumferential surface 5a of the small flange 5 of the inner ring 2 in the radial direction, the inner circumferential surface 11b and the outer circumferential surface 5a are close to each other, and an annular fine clearance K2 is formed therebetween.

Above, an annular opening portion A1 is formed between the small flange 5 of the inner ring 2 and the end portion 3d on one axial side of the outer ring 3, and the small-diameter annular portion 11 is configured to block the annular opening portion A1 at the fine clearances K1 and K2 between each of the small flange 5 and the end portion 3d of the outer ring 3.

For example, in a case where the inner diameter of the taper roller bearing 1 is 30 to 40 mm and the outer diameter is 70 to 80 mm, the fine clearance K1 on the radial outer side can be 50 to 125 μm, and is 100 μm in the embodiment. In addition, in the taper roller bearing 1 having the dimension, the fine clearance K2 on the radial inner side can be 50 to 125 μm, and is 100 μm in the embodiment. In addition, in the embodiment, a radial dimension partially changes in each of the fine clearances K1 and K2, but the value is a radial dimension, and the clearance is a dimension at a part at which the clearance is the minimum.

As illustrated in the enlarged view on the inner ring 2 side of FIG. 3, in the embodiment, the inner circumferential surface 11b of the small-diameter annular portion 11 includes a first inner circumferential surface portion 21 which is positioned on the inside of the bearing, and a second inner circumferential surface portion 22 which is positioned on the outside of the bearing. The first inner circumferential surface portion 21 and the second inner circumferential surface portion 22 are cylindrical surfaces around a center line C0 (refer to FIG. 1) of the taper roller bearing 1, and a diameter D2 of the second inner circumferential surface portion 22 is smaller than a diameter D1 of the first inner circumferential surface portion 21 (D2<D1). The inner circumferential surface portions 21 and 22 are continuous to each other via an annular surface 23.

The outer circumferential surface 5a of the small flange 5 which radially opposes the inner circumferential surface 11b of the small-diameter annular portion 11 includes a first outer circumferential surface portion 24 which opposes the first inner circumferential surface portion 21 with a fine clearance K2-1, and a second outer circumferential surface portion 25 which opposes the second inner circumferential surface portion 22 with a fine clearance K2-2. The first outer circumferential surface portion 24 has a cylindrical surface around the center line C0 of the taper roller bearing 1, and the second outer circumferential surface portion 25 has an R-surface which is formed in the small flange 5. The first outer circumferential surface portion 24 and the second outer circumferential surface portion 25 are continuous to each other, and a boundary thereof is a virtual surface which is orthogonal to the center line C0 including the annular surface 23. In addition, a diameter d2 of the second outer circumferential surface portion 25 is smaller than a diameter d1 of the first outer circumferential surface portion 24 (d2<d1).

According to the configuration in the small-diameter annular portion 11, the annular opening portion A1 which is the inflow side of the lubricating oil can suppress the inflow of the lubricating oil to the inside of the bearing being blocked by the small-diameter annular portion 11 of the cage 10 with the fine clearances K1 and K2. Furthermore, a labyrinth structure having the annular fine clearances K2-1 and K2-2 which have different steps (different diameters) is formed between the small flange 5 and the small-diameter annular portion 11, and on the inner ring 2 side of the annular opening portion A1, it is possible to more efficiently suppress the inflow of the lubricating oil to the inside of the bearing. As a result, as an amount of lubricating oil decreases on the inside of the bearing, it is possible to reduce rolling viscosity resistance and agitating resistance of the taper roller bearing 1, and a rotation torque of the taper roller bearing 1 is reduced.

In addition, the lubricating oil which passes through the fine clearances K1 and K2 is used for lubricating the taper roller bearing 1. In other words, the fine clearances K1 and K2 allow passage of the lubricating oil, but the inflow of the lubricating oil of which an amount is equal to or greater than an amount necessary for the lubrication to the inside of the bearing is restricted on the inside of the taper roller bearing 1.

In addition, in the embodiment, the diameter d1 of the first outer circumferential surface portion 24 is greater than the diameter D2 of the second inner circumferential surface portion 22 (d1>D2), the fine clearance K2-1 is configured not be seen from one axial side, and it is possible to more efficiently suppress intrusion of the lubricating oil.

As illustrated in FIG. 1, the inner ring 2 of the taper roller bearing 1 is externally fitted and attached to a shaft (rotation shaft) 8, and a circular portion 9 is provided on one axial side. The circular portion 9 may be an annular member which is externally fitted and attached to the shaft (rotation shaft) 8, or may be a part (part of which the diameter is large) of the shaft 8.

In this case, the diameter D2 of the second inner circumferential surface portion 22 of which the diameter is the minimum on the inner circumferential surface 11b of the small-diameter annular portion 11 (refer to FIG. 3) is set to be greater than an outer diameter d7 of the circular portion 9 (D2>d7). In addition, the maximum value of the outer diameter d7 is determined according to an ISO (International Organization for Standardization) standard. In other words, in the embodiment, the diameter D2 of the second inner circumferential surface portion 22 is set to be greater than a value based on the ISO value that is the outer diameter d7 of the circular portion 9.

Here, the outer diameter d7 (maximum value) of the circular portion 9 is determined in accordance with the size of the taper roller bearing 1. For example, in a case where the inner diameter is 30 mm, the outer diameter is 55 mm, and an axial dimension (entire width) is 17 mm, the maximum value of the outer diameter d7 of the circular portion 9 based on the ISO standard is 35 mm. In this case, the diameter D2 of the second inner circumferential surface portion 22 is set to be greater than the outer diameter d7 (35 mm). For example, in a case where the diameter D2 of the second inner circumferential surface portion 22 can be set to be greater than the outer diameter d7 by 1 to 3 millimeters, and the outer diameter d7 of the circular portion 9 is 35 mm, the diameter D2 of the second inner circumferential surface portion 22 can be, for example, 37 mm.

By setting an inner circumferential surface shape of the small-diameter annular portion 11 in this manner, while maintaining the shape of the bearing based on the ISO standard, the taper roller bearing 1 can be provided with the labyrinth structure on the small flange 5 side of the inner ring 2.

In addition, as described above, in order to provide the fine clearance K2 (K2-1 and K2-2) having high dimension accuracy between the small flange 5 and the small-diameter annular portion 11, the finishing processing, such as polishing, is performed with respect to the outer circumferential surface 5a of the small flange 5, and additionally, the cage 10 made of a resin may be molded with high accuracy using a mold.

Otherwise, as another means for providing the fine clearance K2 (K2-1 and K2-2) having high dimension accuracy, the taper roller bearing 1 having the following configuration may be employed.

Figure 4:
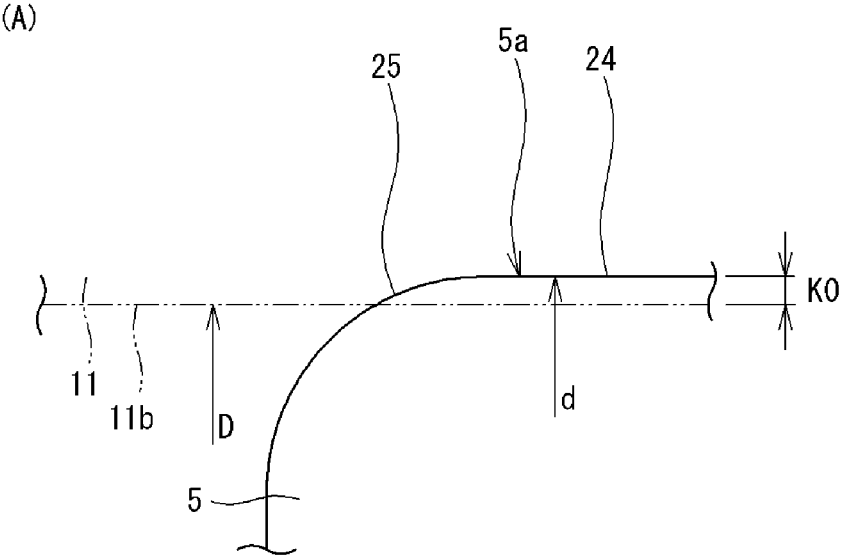
FIGS. 4(A) and 4(B) are views describing a shape of a fine clearance.
Figure 4:
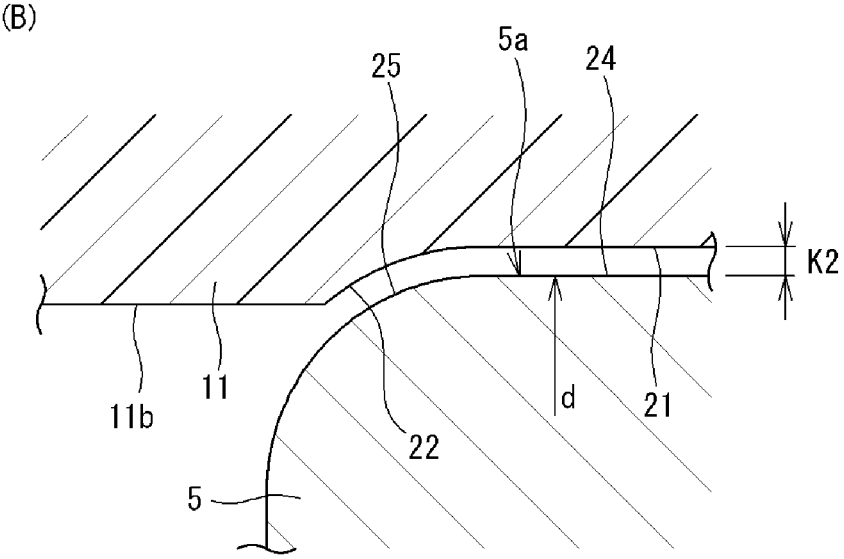

In other words, a point that the cage 10 made of a resin is molded using a mold is the same, but as illustrated in FIG. 4(A), a radial clearance K0 between the small flange 5 and the small-diameter annular portion 11 is set to be a negative clearance. In addition, in FIG. 4(A), the small-diameter annular portion 11 (inner circumferential surface 11b) is illustrated by a two-dot chain line. In other words, a diameter d of the outer circumferential surface 5a of the small flange 5 is slightly greater than a diameter D of the inner circumferential surface 11b of the small-diameter annular portion 11 (d>D).

Here, when the taper roller bearing 1 (refer to FIG. 1) rotates, the taper roller 4 rolls on the inner ring raceway surface 2a of the inner ring 2 and on the outer ring raceway surface 3a of the outer ring 3, and accordingly, the cage 10 also rotates with respect to the inner ring 2 and the outer ring 3. Here, as initial compatibility processing, processing of rotating the taper roller bearing 1 for a predetermined period of time after assembly is performed.

In other words, as described above, since the radial clearance K0 between the small flange 5 and the small-diameter annular portion 11 is set to be a negative clearance, as illustrated in FIG. 4(B), the small-diameter annular portion 11 (a part of the inner circumferential surface 11b) is worn out slidably moving therebetween, and between the small flange 5 and the small-diameter annular portion 11, the minimum fine clearance K2 (positive clearance) is automatically formed. This is because the inner ring 2 is made of steel while the cage 10 is made of a resin, and the small-diameter annular portion 11 is made of a material having lower wear resistance than that of the small flange 5.

Accordingly, it is possible form (automatically form) the labyrinth structure between the small flange 5 and the small-diameter annular portion 11 that is a on the inflow side of the lubricating oil.

In addition, in the aspect illustrated in FIGS. 4(A) and 4(B), a case where the radial clearance K0 between the small flange 5 and the small-diameter annular portion 11 is a negative clearance is described, but the radial clearance K0 may be a zero clearance. In other words, when describing with reference to FIG. 4(A), the diameter d of the outer circumferential surface 5a of the small flange 5 may be the same as the diameter D of the inner circumferential surface 11b of the small-diameter annular portion 11 (d=D). In this case, the fine clearance K2 (positive clearance) is also automatically formed.

In addition, as described in FIGS. 4(A) and 4(B), since the fine clearance K2 is automatically formed, it is preferable that the outer circumferential surface 5a of the small flange 5 is a coarse surface, and accordingly, it is possible to promote the wear of the small-diameter annular portion 11 by the slidable movement. In addition, since the outer circumferential surface 5a of the small flange 5 is a coarse surface, for example, the outer circumferential surface 5a can be a cutting surface to which cutting processing is performed, or can be a corrugated surface to which blast processing (shot blasting).

[Regarding Column Portion 13 of Cage 10]

Figure 5:
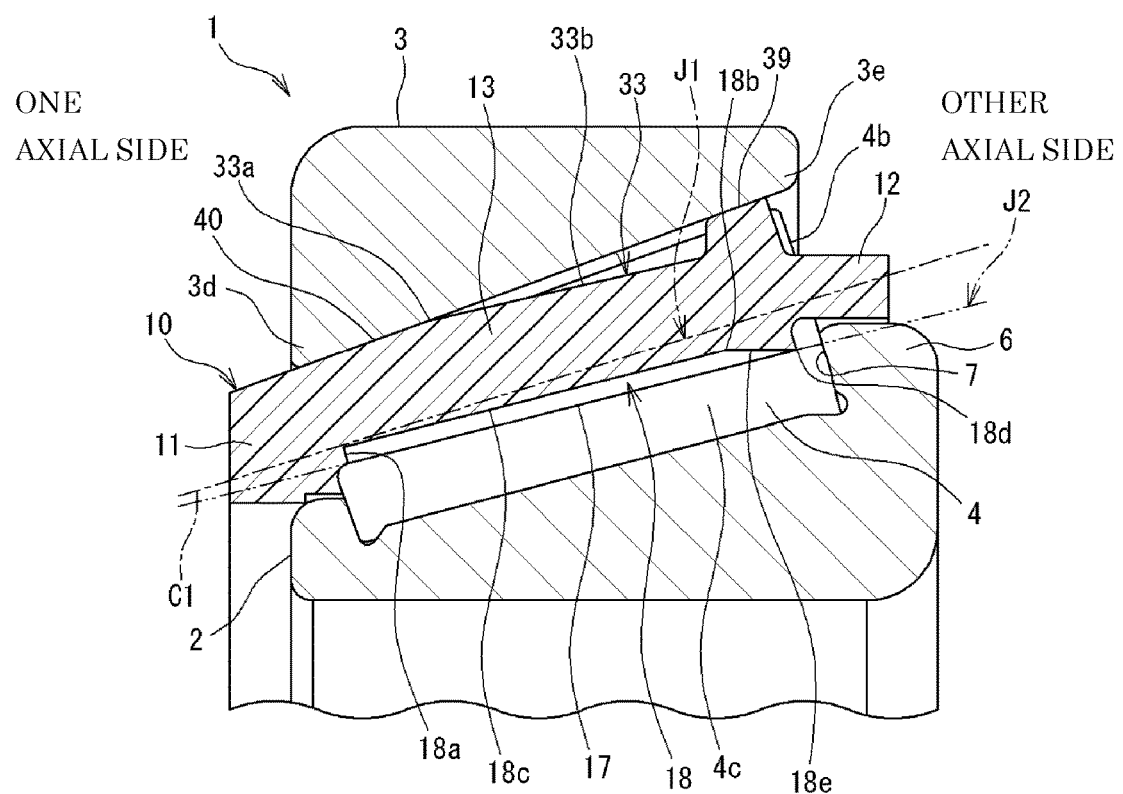
FIG. 5 is a sectional view of an inner ring, an outer ring, and the cage.
Figure 6:
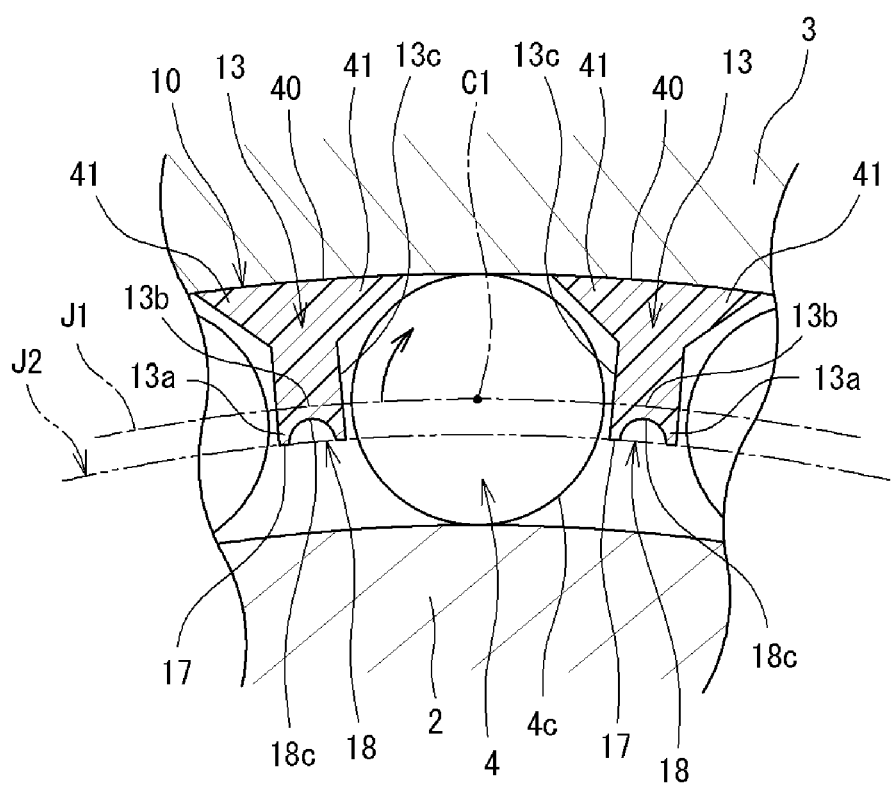
FIG. 6 is a sectional view in which the inner ring, the outer ring, the cage, and a taper roller are viewed from the axial direction.

FIG. 5 is a longitudinal sectional view of the inner ring 2, the outer ring 3, and the cage 10. FIG. 6 is a sectional view when the inner ring 2, the outer ring 3, the cage 10, and the taper roller 4 are viewed from the axial direction. In addition, in FIG. 6, in order to describe the shape of the column portion 13 (groove 18 which will be described later), the shape is deformed to be different from a real shape in the description.

Here, in FIG. 1, since the plurality of taper rollers 4 held by the cage 10 are installed along the inner ring raceway surface 2a and the outer ring raceway surface 3a which have a tapered shape, each of center lines C1 of the taper rollers 4 is included on single virtual taper surface J1 (first virtual taper surface) of which a diameter increases as approaching from one axial side to the other side.

In addition, in the embodiment, as illustrated in FIGS. 5 and 6, a radial inner surface 17 of the column portion 13 is provided along a second virtual taper surface J2 set in the vicinity of the first virtual taper surface J1 across the entire length of the column portion 13 in the longitudinal direction. The second virtual taper surface J2 has a shape of which a diameter increases as approaching from one axial side to the other side. In addition, the first virtual taper surface J1 and the second virtual taper surface J2 may be in a similarity relation, but may not be in a similarity relation.

The second virtual taper surface J2 of the embodiment has a diameter which is slightly smaller than that of the first virtual taper surface J1. Therefore, the radial inner surface 17 of the column portion 13 is configured to be provided along the second virtual taper surface J2 which is slightly smaller than the first virtual taper surface J1, and the radial inner surface 17 is positioned further on the radial inner side than a half portion on the outer ring 3 side in the taper roller 4. A radius difference between the first virtual taper surface J1 and the second virtual taper surface J2 can be, for example, in a range of 500 μm to 1000 μm including the maximum value and the minimum value thereof, and the radius difference (minimum value) in the embodiment is 700 μm.

In addition, in the radial inner surface 17, the groove 18 which extends along the longitudinal direction of the column portion 13 is formed. As illustrated in FIG. 5, the groove 18 has a surface (groove side surface 18a) which intersects with (is orthogonal to) the groove longitudinal direction on one axial side, and is not open on one axial side.

Meanwhile, the groove 18 does not have a surface which is orthogonal to the groove longitudinal direction on the other axial side, and is open on the other axial side. Specifically speaking, the groove 18 has a shallow part 18e (refer to FIGS. 7 and 8) as approaching a groove final end (end portion 18d) on the other axial side in a region on the other axial side from a middle portion 18b, and as the groove depth becomes zero at the groove final end (end portion 18d), the groove 18 is configured to be open as approaching the other radial side.

Figure 7:
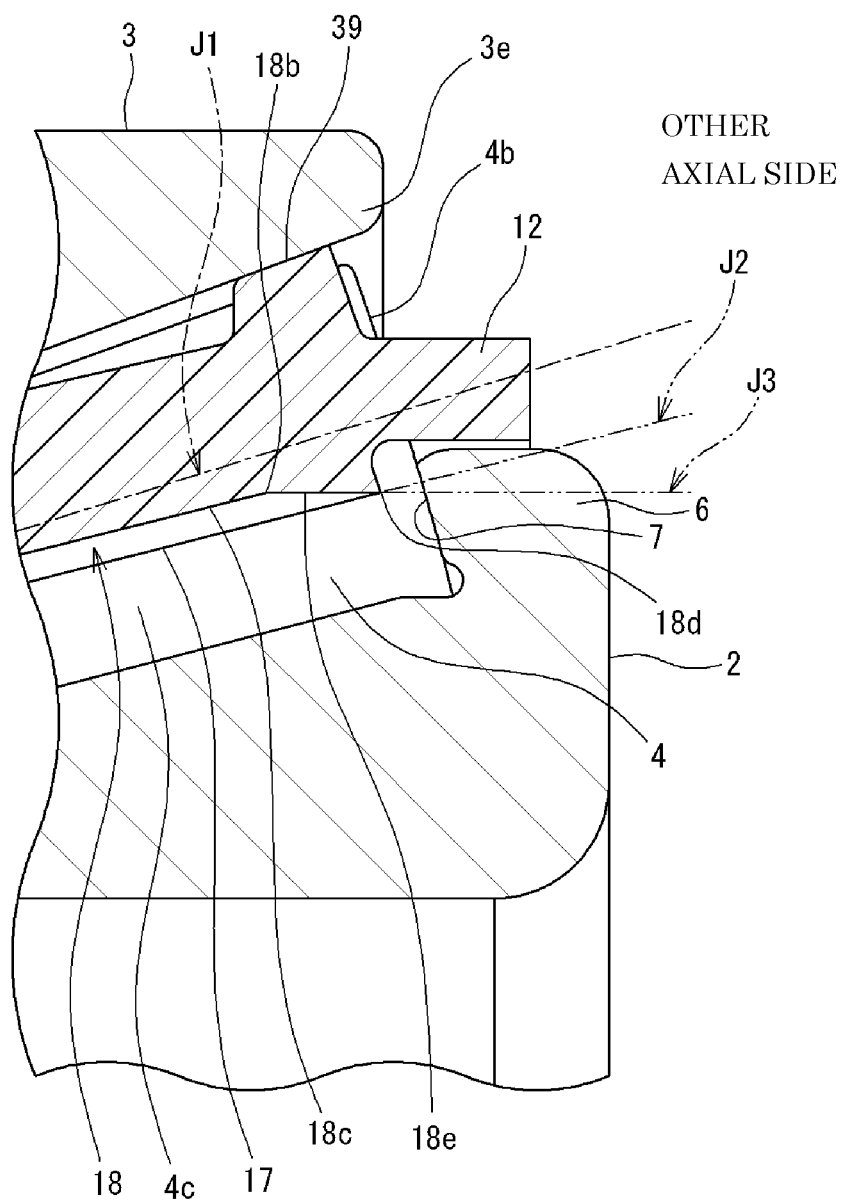
FIG. 7 is a sectional view illustrating that a part of the inner ring and the cage is enlarged.

Therefore, a sectional shape of the groove 18 is not constant along the groove longitudinal direction and changes in the middle portion 18b on the other axial side. In a region on the other axial side from the middle portion 18b, as the groove 18 becomes shallow, the groove sectional shape becomes smaller. In addition, as illustrated in FIG. 7, an extending virtual line J3 which extends from the end portion (groove final end) 18d on the opening side of a bottom portion 18c intersects with the flange surface 7 on the axial inner side of the large flange 6.

According to the configuration in the radial inner surface 17 of the column portion 13, when the taper roller bearing 1 rotates, the taper roller 4 rotates around the center line C1 of itself, and the radial inner surface 17 can scrap the lubricating oil attached to an outer circumferential surface 4c of the taper roller 4 across the entire length in the longitudinal direction of the column portion 13. Therefore, it is possible to reduce rolling viscosity resistance and agitating resistance in the taper roller bearing 1.

Furthermore, in the embodiment, as illustrated in FIG. 5, since the radial inner surface 17 is inclined to the radial outer side as approaching the other axial side, the scraped lubricating oil flows to the other axial side along the radial inner surface 17 by a centrifugal force. Here, since the groove 18 is provided on the radial inner surface 17, the lubricating oil can flow along the groove 18 not being attached to the taper roller 4 again, and is supplied to the flange surface 7 of the large flange 6. Therefore, it is possible to reduce sliding friction resistance between the large flange 6 and the taper roller 4 by the supplied lubricating oil.

In addition, as described above, the groove 18 has a part 18e (refer to FIGS. 7 and 8) which becomes shallow as approaching the groove final end (end portion 18d) on the other axial side in a region on the other axial side from the middle portion 18b. Accordingly, the lubricating oil which flows along the groove 18 can flow toward the flange surface 7 of the large flange 6 while having a speed component in the flow direction, and it is possible to efficiently supply the lubricating oil to the flange surface.

In addition, the first virtual taper surface J1 and the second virtual taper surface J2 may match each other. In this case, the radial inner surface 17 can also scrape the lubricating oil attached to the outer circumferential surface 4c of the taper roller 4.

However, as described in the embodiment illustrated in FIGS. 5 and 6, it is preferable that the second virtual taper surface J2 has a diameter which is slightly smaller than that of the first virtual taper surface J1 across the entire length in the axial direction.

The reason thereof is that the rigidity (strength) of a radial inner end portion 13a (refer to FIG. 6) of the column portion 13 becomes lower compared to that of the other part (solid part 13b further on the radial outer side than the radial inner end portion 13a) by the groove 18 in a case where the groove 18 is formed on the radial inner surface 17 of the column portion 13. In other words, this is because a configuration in which, since the taper roller 4 comes into contact with the column portion 13 at a part at which the first virtual taper surface J2 intersects with the circumferential side surface 13c of the column portion 13, the diameter of the second virtual taper surface J2 is slightly smaller than the diameter of the first virtual taper surface J1, and thus, as described above, the radial inner end portion 13a having low rigidity (strength) does not hold the taper roller 4 coming into contact with the taper roller 4, but the other part (part at which the influence of the groove 18 becomes weak: solid part 13b) holds the taper roller 4 coming into contact with the taper roller 4, is employed.

Above, in the embodiment, the taper roller 4 can come into contact with the solid part 13b at which the groove 18 in the column portion 13 is not provided, and it is prevented that the groove 18 becomes a weakness from the viewpoint of a strength. In addition, as illustrated in FIG. 6, the circumferential side surface (pocket surface) 13c in the column portion 13 (excluding the roller retaining portion 41 which will be described later) becomes a surface which is in a linear shape along the radial direction.

As described above, in the embodiment, the minimum value of the radius difference between the first virtual taper surface J1 and the second virtual taper surface J2 is 700 μm. This is based on the shape of the groove 18 which is a semicircular shape and the radius thereof which is 500 μm in FIG. 6. In addition, in this case, a groove width which is the circumferential dimension of the groove 18 is 1 mm. In other words, since the taper roller 4 is brought into contact with the solid part 13b of the column portion 13, it is necessary that the minimum value of the radius difference between the first virtual taper surface J1 and the second virtual taper surface J2 is a value obtained by adding a margin dimension to the depth (radius) of the groove 18. In the embodiment, a value (700 μm) obtained by adding 200 μm as a margin dimension to 500 μm of the depth (radius) of the groove 18 is the minimum value of the radius difference.

A shape on the radial outer side of the column portion 13 will be described. In FIG. 2, on the radial outer side of the column portion 13, a recess portion 33 which allows the pockets 14 and 14 adjacent to each other to communicate with each other by being recessed in the radial direction is provided. In addition, in the recess portion 33, a depth of an end 33a (refer to FIG. 5) on one axial side is zero and a bottom surface 33b of the recess portion 33 has a shape of an inclined surface that is inclined as approaching the radial outer side toward the other axial side. In this manner, as the recess portions 33 are provided in each of the column portion 13, the lubricating oil in the vicinity of the inner circumferential surface 3b of the outer ring 3 can flow between the pockets 14 and 14 adjacent to each other, and can weaken the agitating resistance of the lubricating oil.

[Regarding Large-Diameter Annular Portion 12 of Cage 10 (First Thereof)]

As described above, in the taper roller bearing 1 illustrated in FIG. 1, one axial side is an inflow side of the lubricating oil and the other axial side is an outflow side of the lubricating oil. In other words, the lubricating oil flows out from an annular opening portion A2 formed between the large flange 6 of the inner ring 2 and an end portion 3e on the other axial side of the outer ring 3. In addition, the large-diameter annular portion 12 is provided in the annular opening portion A2.

Figure 8:
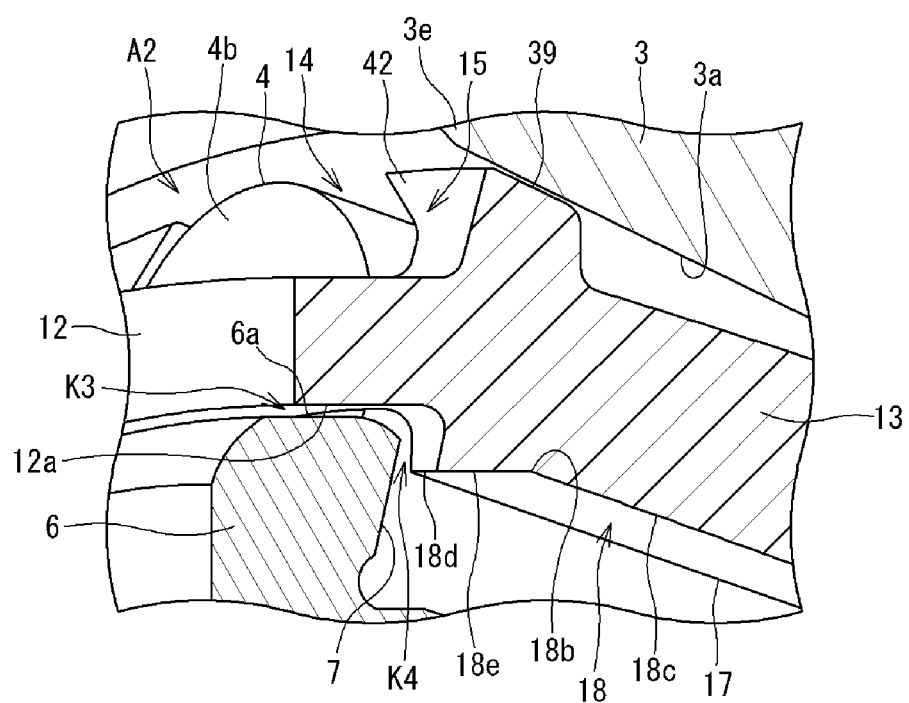
FIG. 8 is a perspective view illustrating a large-diameter annular portion and the periphery thereof.

FIG. 8 is a perspective view illustrating the large-diameter annular portion 12 and the periphery thereof. A configuration on the outer ring 3 side of the large-diameter annular portion 12, that is, on the outer circumferential side of the large-diameter annular portion 12 will be described first.

A cut-out portion 15 which is continuous to the pocket 14 is provided on the outer circumferential side of the large-diameter annular portion 12. As illustrated in FIG. 3, while the annular opening portion A1 on the inflow side of the lubricating oil is blocked having the fine clearances K1 and K2 by the small-diameter annular portion 11, the annular opening portion A2 (refer to FIG. 8) which is the outflow side of the lubricating oil is provided with the cut-out portion 15, and according to this, the annular opening portion A2 is not blocked and the pocket 14 is open on the radial outer side of the large-diameter annular portion 12. By the cut-out portion 15, on the outflow side (annular opening portion A2) of the lubricating oil, it is possible to promote the discharge of the lubricating oil on the inside of the bearing, and to reduce rolling viscosity resistance and agitating resistance in the taper roller bearing 1.

Next, a configuration on an inner circumferential side of the large-diameter annular portion 12 will be described. In FIG. 8, an inner circumferential surface 12a of the large-diameter annular portion 12 opposes an outer circumferential surface 6a of the large flange 6 in the radial direction, the inner circumferential surface 12a and the outer circumferential surface 6a approach each other, and an annular fine clearance K3 is formed therebetween.

For example, in a case where the inner diameter of the taper roller bearing 1 is 30 to 40 mm and the outer diameter is 70 to 80 mm, the fine clearance K3 can be 75 to 125 μm, and is 100 μm in the embodiment. In addition, the radial dimension of the fine clearance K3 may partially change, and the value is a dimension in the radial direction and is a dimension at a part at which the clearance is the minimum.

In addition, the fine clearance K3 may be set to decrease as approaching the other axial side (outside of the bearing), that is, toward the outflow direction of the lubricating oil.

Above, the labyrinth structure which suppresses the flow of the lubricating oil to the outside of the bearing from the inside of the bearing is formed between the large flange 6 and the large-diameter annular portion 12. According to the labyrinth structure, the outflow of the lubricating oil from between the large flange 6 and the large-diameter annular portion 12 can be suppressed, the lubricating oil can remain in the vicinity of the flange surface 7 of the large flange 6. In particular, in the embodiment, in the region on the radial outer side of the flange surface 7 which is the upstream side of the fine clearance K3, an annular enlarged space portion K4 is formed, and the lubricating oil can remain in the annular enlarged space portion K4. In addition, the annular enlarged space portion K4 is made of a region formed between the large flange 6 and the cage 10. In addition, it is possible to use the lubricating oil which remains in the vicinity of the flange surface 7 as the lubricating oil for the lubrication between the flange surface 7 and the large end surface 4b of the taper roller 4, and to reduce sliding friction resistance between the large flange 6 and the taper roller 4.

In addition, as described above, since the cut-out portion 15 which is continuous to the pocket 14 is provided on the outer circumferential side of the large-diameter annular portion 12, in the annular opening portion A2 which is the outflow side of the lubricating oil, on the outer ring 3 side, the discharge of the lubricating oil on the inside of the bearing is promoted. Meanwhile, on the inner ring 2 side, by the labyrinth structure, it is possible to supply the lubricating oil between the flange surface 7 of the large flange 6 and the large end surface 4b of the taper roller 4.

Above, in order to reduce rolling viscosity resistance or agitating resistance, it is possible to reduce the sliding friction resistance by holding the lubricating oil at a necessary part (slide surface between the flange surface 7 and the large end surface 4b) while promoting the outflow of the lubricating oil on the inside of the bearing by the cut-out portion 15.

In addition, in the taper roller bearing 1 of the embodiment, as described above, the small-diameter annular portion 11 of the cage 10 blocks the annular opening portion A1 (refer to FIG. 3) on the inflow side of the lubricating oil having the fine clearances K1 and K2 between each of the small flange 5 and the outer ring 3 (end portion 3d).

In this manner, as the inflow side (annular opening portion A1) of the lubricating oil is blocked having the fine clearances K1 and K2 by the small-diameter annular portion 11, the inflow of the lubricating oil to the inside of the bearing can be suppressed. Therefore, the amount of outflow increases in the annular opening portion A2 on the axial opposite side with respect to the inflow of the lubricating oil, and there is a possibility that the inside of the bearing becomes a poor lubricating oil state. However, in FIG. 8, according to the labyrinth structure formed between the large flange 6 and the large-diameter annular portion 12, it becomes possible to hold the minimum lubricating oil which is necessary on the inside of the bearing, and the lubricating oil can be used as the lubricating oil between the large flange 6 and the taper roller 4.

Above, in order to reduce rolling viscosity resistance or agitating resistance, it is possible to reduce the sliding friction resistance by giving the lubricating oil at a necessary part while suppressing the inflow of the lubricating oil to the inside of the bearing by the small-diameter annular portion 11.

Here, as described above, since the fine clearance K3 having high dimension accuracy is provided between the large flange 6 of the inner ring 2 and the large-diameter annular portion 12 of the cage 10, the finishing processing, such as polishing, is performed with respect to the outer circumferential surface 6a of the large flange 6, and the cage 10 made of a resin may be molded using a mold with high accuracy.

In addition, as another means for providing the fine clearance K3 having high dimension accuracy, the taper roller bearing 1 having the following configuration may be employed.

Figure 9:
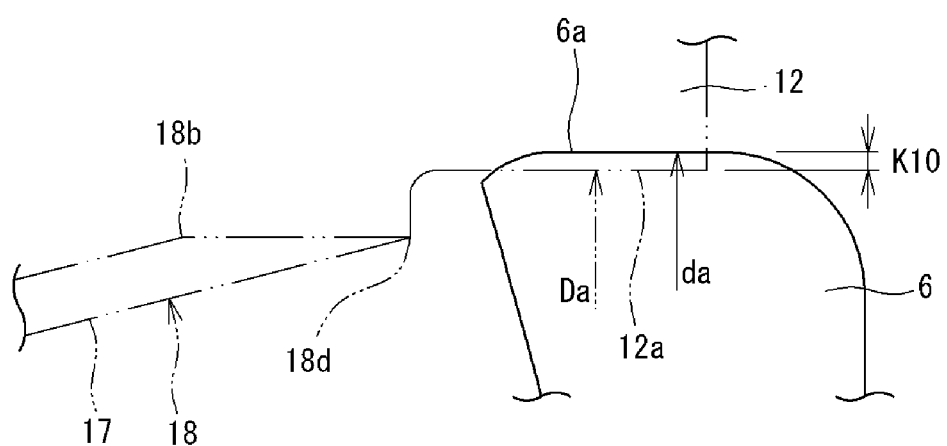
FIGS. 9(A) and 9(B) are views describing forming of the fine clearance.
Figure 9:
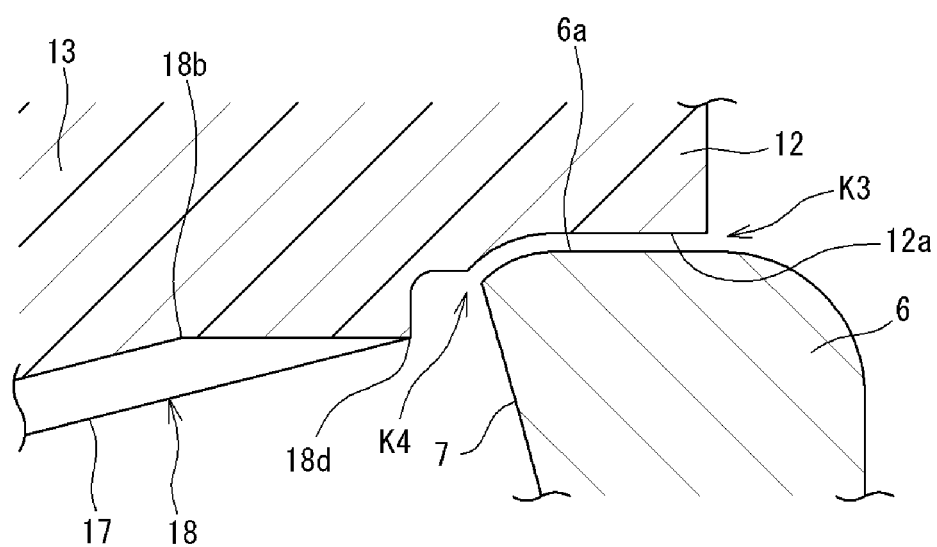

In other words, a point that the cage 10 made of a resin is molded using a mold is the same, but as illustrated in FIG. 9(A), a radial clearance K10 between the large flange 6 and the large-diameter annular portion 12 is set to be a negative clearance. In addition, in FIG. 9(A), the large-diameter annular portion 12 (inner circumferential surface 12a) is illustrated by a two-dot chain line. In other words, a diameter da of the outer circumferential surface 6a of the large flange 6 is greater than a diameter Da of the inner circumferential surface 12a of the large-diameter annular portion 12 (da>Da).

In addition, similar to the technology described by using FIGS. 4(A) and 4(B), when the taper roller bearing 1 (refer to FIG. 1) rotates, the cage 10 also rotates with respect to the inner ring 2 and the outer ring 3, and thus, as the initial compatibility processing, processing of rotating the taper roller bearing 1 for a predetermined period of time after the assembly is performed.

In other words, as described above, since the radial clearance K10 between the large flange 6 and the large-diameter annular portion 12 is set to be a negative clearance, as illustrated in FIG. 9(B), the large-diameter annular portion 12 (inner circumferential surface 12a) is worn out being slidable therebetween, and the minimum fine clearance K3 (positive clearance) is automatically formed between the large flange 6 and the large-diameter annular portion 12. This is because the inner ring 2 is made of steel while the cage 10 is made of a resin, and the large-diameter annular portion 12 is made of a material having low wear resistance than that of the large flange 6.

Accordingly, it is possible to form (automatically form) the labyrinth structure between the large flange 6 of the inner ring 2 which is the outflow side of the lubricating oil and the large-diameter annular portion 12 of the cage 10.

In addition, in the embodiment illustrated in FIGS. 9(A) and 9(B), a case where the radial clearance K10 becomes a negative clearance is described, but similar to the technology described by using FIGS. 4(A) and 4(B), the radial clearance K10 may be a zero clearance. Furthermore, similar to the technology described by using FIGS. 4(A) and 4(B), it is preferable that the outer circumferential surface 6a of the large flange 6 is a coarse surface.

[Modification Example of Large-Diameter Annular Portion 12]

Figure 10:
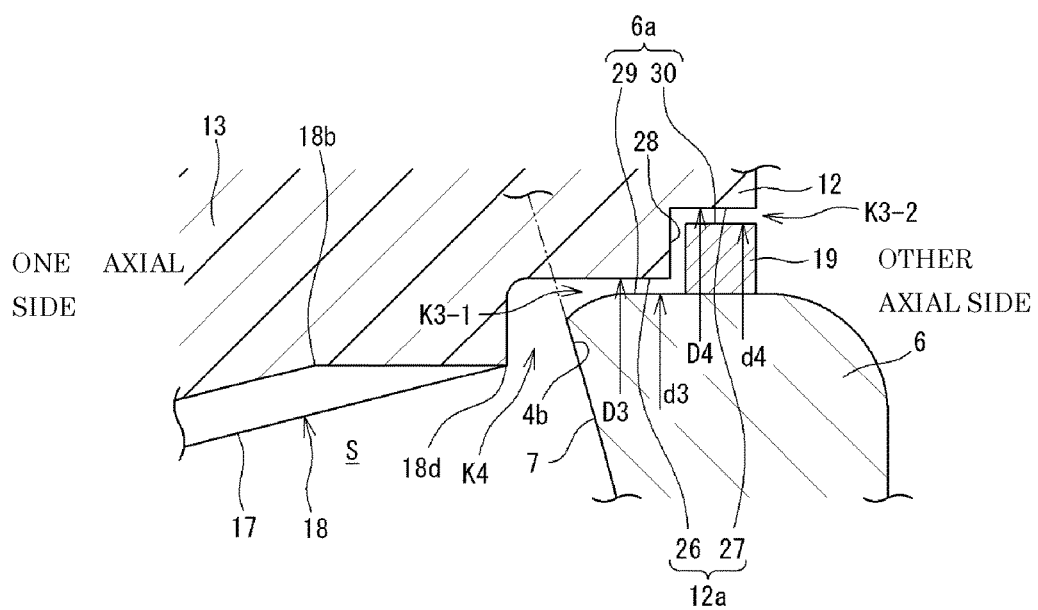
FIG. 10 is a sectional view illustrating a large flange, a large-diameter annular portion, and the periphery thereof.

FIG. 10 is a sectional view illustrating the large flange 6, the large-diameter annular portion 12, and the periphery thereof. In the aspect illustrated in FIG. 10, the inner circumferential surface 12a of the large-diameter annular portion 12 includes a first inner circumferential surface portion 26 which is positioned on the inside of the bearing, and a second inner circumferential surface portion 27 which is positioned on the axial outer side. In addition, a diameter D4 of the second inner circumferential surface portion 27 is greater than a diameter D3 of the first inner circumferential surface portion 26 (D4>D3). The inner circumferential surface portions 26 and 27 are continuous to each other via an annular surface 28.

The outer circumferential surface 6a of the large flange 6 which opposes the inner circumferential surface 12a of the large-diameter annular portion 12 in the radial direction includes a first outer circumferential surface portion 29 which opposes the first inner circumferential surface portion 26 having a fine clearance K3-1, and a second outer circumferential surface portion 30 which opposes the second inner circumferential surface portion 27 having a fine clearance K3-2. In addition, a diameter d4 of the second outer circumferential surface portion 30 is greater than a diameter d3 of the first outer circumferential surface portion 29 (d4>d3).

According to the configuration in the above-described large-diameter annular portion 12, it is possible to form the labyrinth structure having clearances (K3-2 and K3-1) having different steps between the large flange 6 which is the outflow side of the lubricating oil and the large-diameter annular portion 12, and to improve a function of suppressing the outflow of the lubricating oil on the inside of the bearing. As a result, similar to the aspect illustrated in FIG. 8, it is possible to allow the lubricating oil to remain in the vicinity of the flange surface 7 of the large flange 6. In addition, it is possible to use the lubricating oil which remains in the vicinity of the flange surface 7 as the lubricating oil for the lubrication between the flange surface 7 and the large end surface 4b of the taper roller 4, and to reduce the sliding friction resistance between the large flange 6 and the taper roller 4.

In addition, in the embodiment, the diameter d4 of the second outer circumferential surface portion 30 is greater than the diameter D3 of the first inner circumferential surface portion 26, the fine clearance K3-2 is configured not to be seen from one axial side, and the outflow of the lubricating oil is more efficiently suppressed.

In the embodiment illustrated in FIG. 10, the large flange 6 includes an annular member 19 which is separated from the inner ring 2. By externally fitting and fixing the annular member 19 to the large flange 6, the outer circumferential surface of the annular member 19 is the second outer circumferential surface portion 30. However, instead of the annular member 19, although not being illustrated, an annular portion having a sectional shape which is the same as that of the annular member 19 may be formed in the large flange 6. In other words, the annular member 19 may be molded to be integrated with the large flange 6.

[Regarding Large-Diameter Annular Portion 12 of Cage 10 (Second Thereof)]

Figure 11:
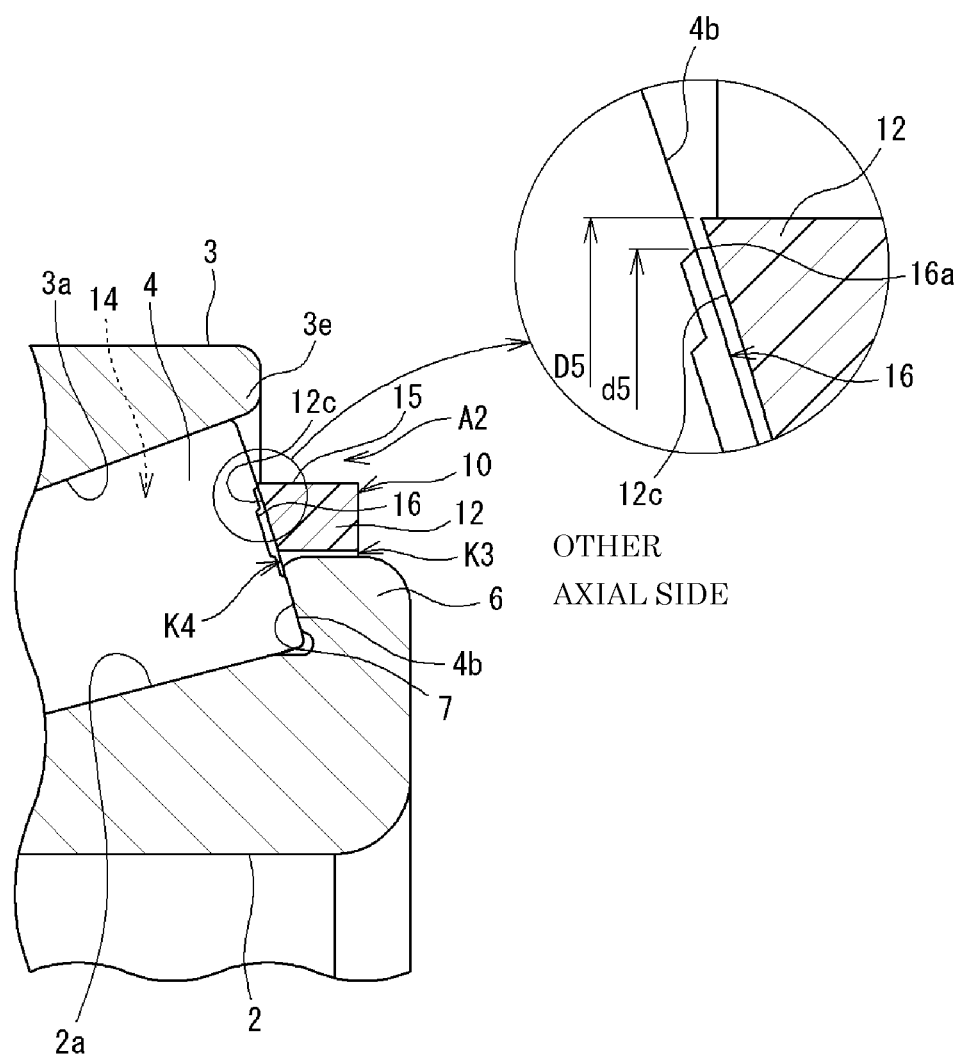
FIG. 11 is a sectional view illustrating the large flange, the large-diameter annular portion, and the taper roller.

FIG. 11 is a sectional view illustrating the large flange 6, the large-diameter annular portion 12, and the taper roller 4. At the center of the large end surface 4b of the taper roller 4, a cavity portion 16 is formed. When manufacturing the taper roller 4, that is, when polishing the large end surface 4b, the cavity portion 16 is necessary. The cavity portion 16 is made of a circular recess portion. In addition, in all of the taper rollers 4 included in one taper roller bearing 1, the cavity portions 16 having the same size are provided at the same position.

In addition, in the embodiment, the large-diameter annular portion 12 and the large flange 6 cover the cavity portion 16 from the other axial side. In addition, the fine clearance K3 is formed between the large-diameter annular portion 12 and the large flange 6, and the fine clearance K3 has a function (labyrinth structure) of suppressing the outflow of the lubricating oil as described above. Therefore, all of the cavity portions 16 are covered by the labyrinth structure made by forming the large-diameter annular portion 12, the large flange 6, and the fine clearance K3.

A configuration of the large-diameter annular portion 12 for covering all of the cavity portions 16 in this manner will be described.

Here, the plurality of taper rollers 4 are disposed along the inner ring raceway surface 2a and the outer ring raceway surface 3a, and are positioned to abut against the flange surface 7. Therefore, as illustrated in the enlarged view of FIG. 11, it is possible to assume a virtual circle which links radial outer end portions 16a of the cavity portions 16 of each of the taper roller 4. Here, in the embodiment, an outer diameter D5 of the axial inner surface 12c included in the large-diameter annular portion 12 is configured to be greater than a diameter d5 of the virtual circle (D5>d5).

According to the configuration, on the outflow side of the lubricating oil provided in the large-diameter annular portion 12, the axial inner surface 12c of the large-diameter annular portion 12 can cover the cavity portion 16 (a large part thereof) of all of the taper rollers 4 from the axial direction, and can hold the lubricating oil between the axial inner surface 12c and each of the cavity portions 16. In addition, it is possible to use the lubricating oil to be held as the lubricating oil between the flange surface 7 of the large flange 6 and the large end surface 4b of the taper roller 4, and thus, to reduce sliding friction resistance between the large flange 6 and the taper roller 4.

In addition, as described above, on the outer circumferential side of the large-diameter annular portion 12, the cut-out portion 15 which is continuous to the pocket 14 is provided, and thus, it is possible to promote the discharge of the lubricating oil on the inside of the bearing on the outer ring 3 side in the annular opening portion A2 which is the outflow side of the lubricating oil. Meanwhile, on the inner ring 2 side, as described above, the large-diameter annular portion 12 can cover the cavity portion 16 of the large end surface 4b of the taper roller 4 from the axial direction and can hold the lubricating oil. Accordingly, in order to reduce rolling viscosity resistance or agitating resistance, it is possible to reduce sliding friction resistance by holding the lubricating oil at a necessary part (slide surface between the flange surface 7 and the large end surface 4b) while promoting the discharge of the lubricating oil on the inside of the bearing by the cut-out portion 15.

Furthermore, as described above, the labyrinth structure which suppresses the flow of the lubricating oil from the inside of the bearing to the outside of the bearing is provided between the large flange 6 and the large-diameter annular portion 12. Therefore, it is possible to suppress the outflow of the lubricating oil from the space between the large flange 6 and the large-diameter annular portion 12, and to allow the lubricating oil to remain in the annular enlarged space portion K4 which is in the vicinity of the flange surface 7 of the large flange 6. In particular, in the embodiment, as illustrated in FIG. 11, the cavity portion 16 is open with respect to the enlarged space portion K4 at the radial inner part. In other words, the cavity portion 16 and the enlarged space portion K4 are linked to each other. Therefore, the lubricating oil held in the cavity portion 16 and the enlarged space portion K4 is supplied to the slide surface between the flange surface 7 and the large end surface 4b, and it is possible to use the lubricating oil as the lubricating oil between the flange surface 7 and the large end surface 4b. As a result, it is possible to further more efficiently reduce the sliding friction resistance of the slide surface.

[Regarding Roller Retaining Portions 41 and 42]

Figure 12:
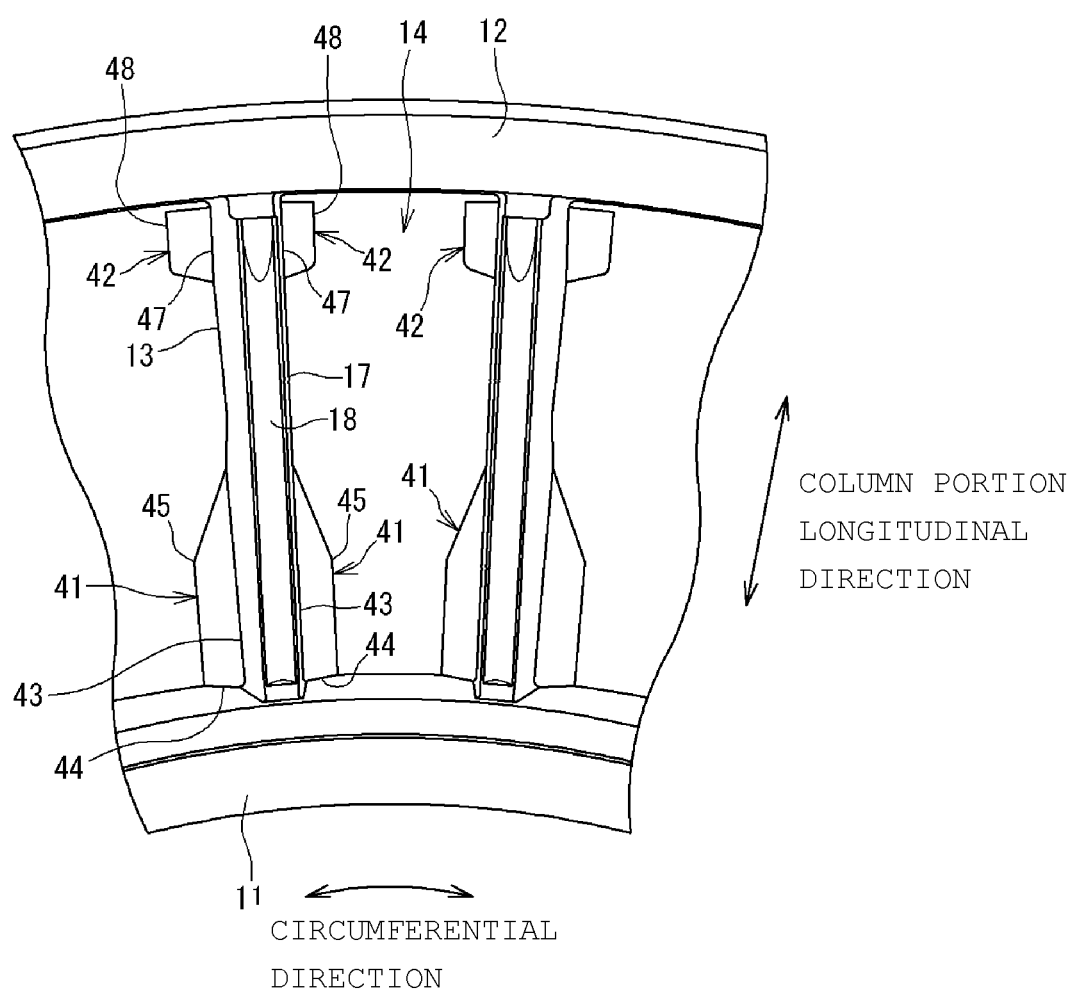
FIG. 12 is a perspective view in which a part of the cage illustrated in FIG. 2 is viewed from an inner circumferential side.
Figure 13:
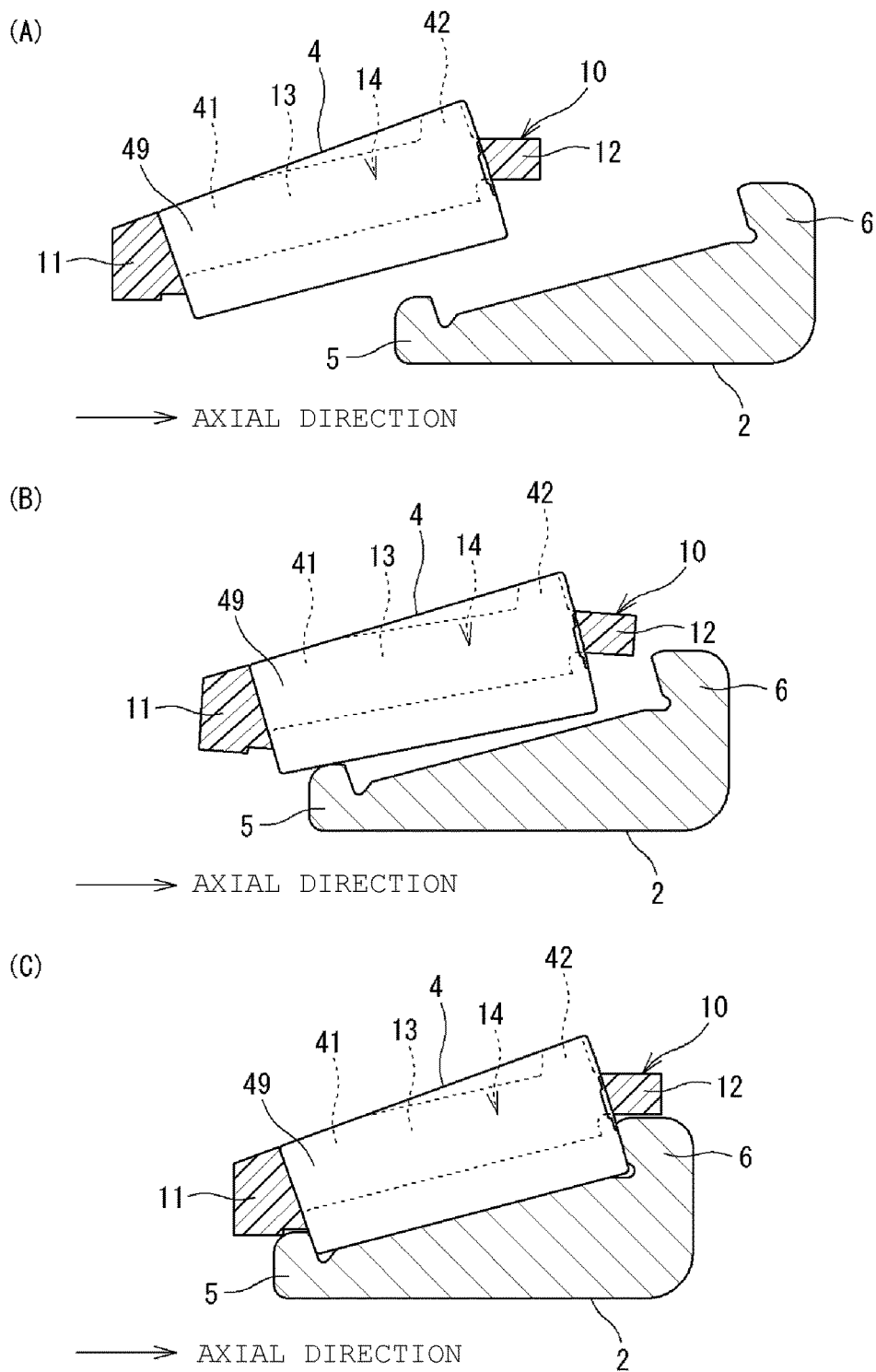
FIG. 13(A) to FIG. 13(C) are views describing an order of assembly of the taper roller bearing.

FIG. 12 is a perspective view in which a part of the cage 10 illustrated in FIG. 2 is viewed from an inner circumferential side. FIG. 13(A) to FIG. 13(C) are view describing an order of assembly of the taper roller bearing 1. In FIG. 13(A), when assembling the taper roller bearing 1, first, the assembled cage 10 and the taper roller 4 are combined with each other, and then, the combined cage 10 and taper roller 4 are assembled to the inner ring 2 (FIG. 13(C)). Here, when assembling the taper roller bearing 1, it is necessary to prevent the taper roller 4 accommodated in the pocket 14 from falling out to the radial outer side. Therefore, the cage 10 includes the first roller retaining portion 41 and the second roller retaining portion 42. In addition, the assembly of the taper roller 4 to the cage 10 is performed by inserting the taper roller 4 into each of the pockets 14 from the inner circumferential side of the cage 10.

In FIG. 12, the first roller retaining portions 41 are provided on the small-diameter annular portion 11 side, that is, on both sides in the circumferential direction of each of the column portions 13. The first roller retaining portion 41 is provided at the radial outer part of the column portion 13 for preventing the taper roller 4 from falling out to the radial outer side (refer to FIGS. 2 and 6).

In FIG. 12, the second roller retaining portions 42 are provided on the large-diameter annular portion 12 side, that is, on both sides in the circumferential direction of each of the column portions 13. The second roller retaining portion 42 is provided at the radial outer part of the column portion 13 for preventing the taper roller 4 from falling out to the radial outer side (refer to FIG. 2).

In addition, the first roller retaining portion 41 and the second roller retaining portion 42 are discontinuous to each other, and are provided to be separated from each other in the column portion longitudinal direction.

The first roller retaining portion 41 has a shape of a protruding beam which is a fixed end on the column portion 13 side and on the small-diameter annular portion 11 side, and is a free end on the tip end side in the extending direction which extends in the circumferential direction and in the column portion longitudinal direction. In other words, the first roller retaining portion 41 has a shape of a protruding beam (a shape of a cantilever beam) which is a fixed end being integrated with the column portion 13 at one end 43 in the circumferential direction on the column portion 13 side, and is a free end at another end 45 in the circumferential direction on the other end side in the column portion longitudinal direction while being a fixed end which is integrated with the small-diameter annular portion 11 at one end 44 in the column portion longitudinal direction on the small-diameter annular portion 11 side. Each of the first roller retaining portions 41 is likely to be deformed since the first roller retaining portions 41 have such a shape of a protruding beam, and in particular, have a shape of which a tip portion side in the protruding direction is likely to be bent.

Although not being illustrated, in a case where the first roller retaining portion 41 and the second roller retaining portion 42 are continuous to each other and the first roller retaining portion 41 is not a free end on the other end side in the column portion longitudinal direction, rigidity of the first roller retaining portion 41 increases, and the first roller retaining portion 41 is configured to be unlikely to be deformed.

The second roller retaining portion 42 is provided on the large-diameter annular portion 12 side, and is provided to protrude in the circumferential direction from the column portion 13. The second roller retaining portion 42 is discontinuous to the large-diameter annular portion 12, and has a shape of a cantilever beam that can be deformed independently from the large-diameter annular portion 12. In other words, the second roller retaining portion 42 is a fixed end which is integrated with the column portion 13 at one end 47 in the circumferential direction on the column portion 13 side, and is a free end at the other end 48 in the circumferential direction.

Above, one pair of first roller retaining portions 41 and 41 is provided on both circumferential sides of one pocket 14 on the small-diameter annular portion 11 side, and a pocket width (dimension in the circumferential direction of the pocket 14) on the small-diameter annular portion 11 side becomes smaller than a taper roller width (diameter of the taper roller 4 at corresponding positions) due to the first roller retaining portions 41 and 41.

Similar to this, one pair of second roller retaining portions 42 and 42 is provided on both circumferential sides of one pocket 14 on the large-diameter annular portion 12 side, and a pocket width (dimension in the circumferential direction of the pocket 14) on the large-diameter annular portion 12 side becomes smaller than a taper roller width (diameter of the taper roller 4 at corresponding positions) due to the second roller retaining portions 42 and 42.

Above, the cage 10 can hold the taper roller 4 by preventing the taper roller 4 in the pocket 14 from falling out to the radial outer side. In addition, attachment of the taper roller 4 to the pocket 14 can be performed from the inner circumferential side.

As described above, in order to assemble the taper roller bearing 1, first, as illustrated in FIG. 13(A), in a state where the taper rollers 4 are accommodated in each of the pockets 14 of the cage 10, the taper rollers 4 are allowed to approach the inner ring 2 from the axial direction and assembled thereto. At this time, the taper roller 4 is prevented from falling out to the radial outer side by the roller retaining portions 41 and 42, and the assembly becomes easy. In addition, when assembling the taper roller bearing 1, as illustrated in FIG. 13(B), it is necessary that a small-diameter side part 49 of the taper roller 4 climbs over the small flange 5 of the inner ring 2, and it is necessary that the taper roller 4 (small-diameter side part 49) is displaced to the radial outer side, and deforms the first roller retaining portion 41 on the radial outer side.

Here, as described above, as the first roller retaining portion 41 has a shape (in particular, a shape by which the tip portion side in the protruding direction is likely to be bent) which is likely to be deformed, the taper roller 4 can easily climb over the small flange 5 pushing (elastically deforming) the first roller retaining portion 41, and the assembly becomes easy.

In the related art, since the column portion functions as a roller retaining portion across the entire length, the rigidity is high, and in a case where the assembly is performed by a similar method, it is necessary to elastically deform the column portion and the small-diameter annular portion. Therefore, the assembly is performed by using a press in the related art. However, in the embodiment, since the first roller retaining portion 41 is easily deformed, the assembly can be performed by a force (manually) of a worker without using a press.

Furthermore, as illustrated in FIG. 13(C), when the taper roller 4 and the cage 10 are assembled to the inner ring 2, since the movement of the taper roller 4 to the radial outer side is regulated by the cage 10 and the axial movement is also not possible being hooked to the small flange 5 and the large flange 6, disassembly becomes impossible. Therefore, for example, even when the unit of the inner ring 2, the taper roller 4, and the cage 10 is dropped to a floor or the like, it becomes possible to prevent the inner ring 2, the taper roller 4, and the cage 10 from coming apart.

In addition, although not being illustrated, by allowing the outer ring 3 to approach to the unit of the inner ring 2, the taper roller 4, and the cage 10 which are integrated with each other from the axial direction, and by assembling the outer ring 3 to the unit, the taper roller bearing 1 is configured.

In addition, in the embodiment, the cage 10 includes the second roller retaining portion 42 which is separated in the column portion longitudinal direction other than the first roller retaining portion 41. Therefore, it is possible to reliably prevent the taper roller 4 from falling out from the pocket 14 by the first roller retaining portion 41 and the second roller retaining portion 42. Furthermore, since the first roller retaining portion 41 is separated from the second roller retaining portion 42 in the column portion longitudinal direction, it is possible to prevent the deformation of the first roller retaining portion 41 from being restricted by the second roller retaining portion 42. In other words, it is possible to prevent characteristics that the deformation of the first roller retaining portion 41 is easy from deteriorating.

Figure 14:
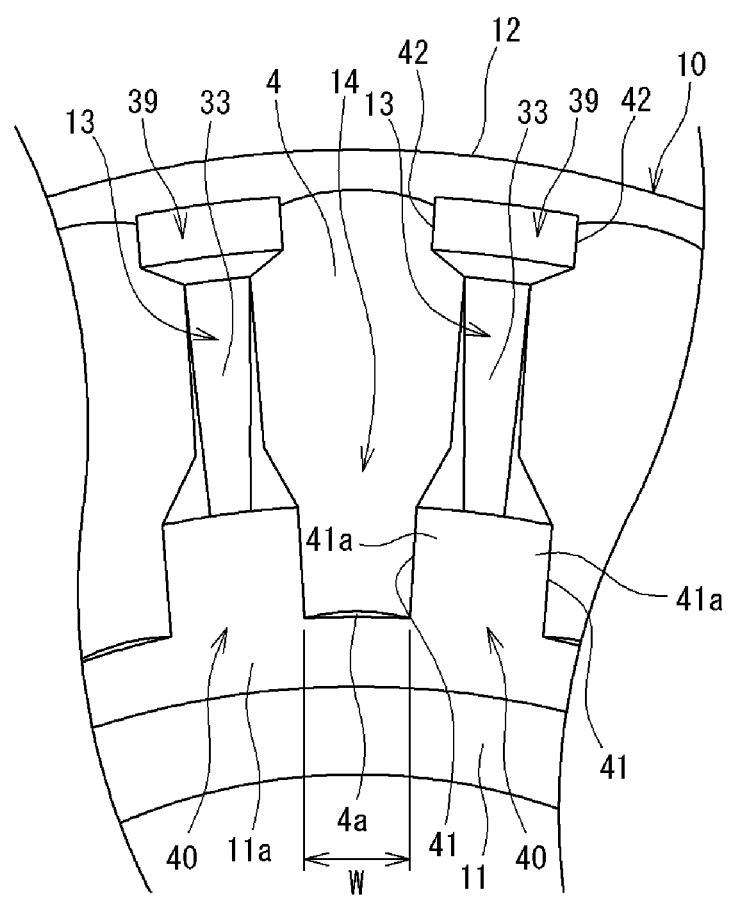
FIG. 14 is a perspective view of the cage and the taper roller.

FIG. 14 is a perspective view of the cage 10 and the taper roller 4. As described above, a part of the outer circumferential surface 11a of the small-diameter annular portion 11 can slidably come into contact with the inner circumferential surface 3b of the outer ring 3 (end portion 3d). Therefore, a part of the outer circumferential surface 11a of the small-diameter annular portion 11, a part of the radial outer surface of the column portion 13 (a part on the small-diameter annular portion 11 side), and the radial outer surface of the first roller retaining portion 41 are included in the slide contact surface 40 which slidably comes into contact with the inner circumferential surface 3b of the outer ring 3, and the slide contact surface 40 can be positioned with respect to the radial direction of the cage 10 together with the slide contact surface 39 on the large-diameter annular portion 12 side. Accordingly, the cage 10 becomes the taper roller bearing 1 which is guided by the outer ring 3. In addition, the clearance (K1: refer to FIG. 3) formed between the outer circumferential surface 11a (slide contact surface 40) of the small-diameter annular portion 11 and the inner circumferential surface 3b in the end portion 3d of the outer ring 3 becomes fine, and intrusion of the lubricating oil on the outside of the bearing to the inside of the bearing becomes difficult. As a result, as described above, it is possible to reduce rolling viscosity resistance and agitating resistance in the taper roller bearing 1.

In addition, the radial outer surface of the second roller retaining portion 42 configures the slide contact surface 39 which is slidable on the inner circumferential surface 3b of the outer ring 3, and accordingly, the slide contact surface 39 can be positioned with respect to the radial direction of the cage 10 together with the slide contact surface 40 on the small-diameter annular portion 11 side.

In addition, in the taper roller bearing 1, as described by using FIG. 12, one pair of first roller retaining portions 41 and 41 is provided on both sides in the circumferential direction of one pocket 14 on the small-diameter annular portion 11 side, and the pocket width on the small-diameter annular portion 11 side becomes smaller than the taper roller width by the first roller retaining portions 41 and 41. In other words, as illustrated in FIG. 14, the first roller retaining portion 41 includes an arc surface portion 41a which is continuous to the outer circumferential surface 11a of the small-diameter annular portion 11 and is provided along smooth arc surface on the radial outer side. In addition, a circumferential width (the pocket width) W of the pocket 14 which is defined as a dimension between one pair of first roller retaining portions 41 and 41 that are provided on both sides in the circumferential direction of the pocket 14, becomes smaller than the minimum value (diameter of the small end surface 4a) of the width in the circumferential direction of the taper roller 4.

In this case, the lubricating oil which can intrude the fine clearance K1 (refer to FIG. 3) formed between the outer circumferential surface 11a (slide contact surface 40) of the small-diameter annular portion 11 and the end portion 3d of the outer ring 3 flows to the other axial side along the inner circumferential surface 3b of the outer ring 3, but a part thereof intrudes to the inside of the pocket 14 blocked by the small end surface 4a of the taper roller 4. However, as illustrated in FIG. 14, as the circumferential width W of the pocket 14 decreases, it is possible to suppress the intrusion of the lubricating oil to the inside of the pocket 14. As a result, it is possible to reduce rolling viscosity resistance and agitating resistance in the taper roller bearing.

Furthermore, the lubricating oil which can intrude to the fine clearance K1 and exists on the radial outer side of the column portion 13 flows backward to the small-diameter annular portion 11 side and further flows to the radial outer side of the adjacent column portion 13 climbing over the small-diameter side of the taper roller 4 according to the rotation of the taper roller 4. However, in the embodiment, since the first roller retaining portion 41 includes the arc surface portion 41a which is continuous to the outer circumferential surface 11a of the small-diameter annular portion 11 and is provided along the smooth arc surface, on the radial outer side, it is possible to make it difficult for the flow of the lubricating oil to be generated. In other words, since the surface which opposes the inner circumferential surface 3b of the outer ring 3 having the fine clearance K1 widens being added by the arc surface portion 41a, resistance of the flow of the lubricating oil increases, and it is possible to suppress generation of the backward flow described above.

[Regarding Taper Roller Bearing 1 and Split Mold]

Figure 15:
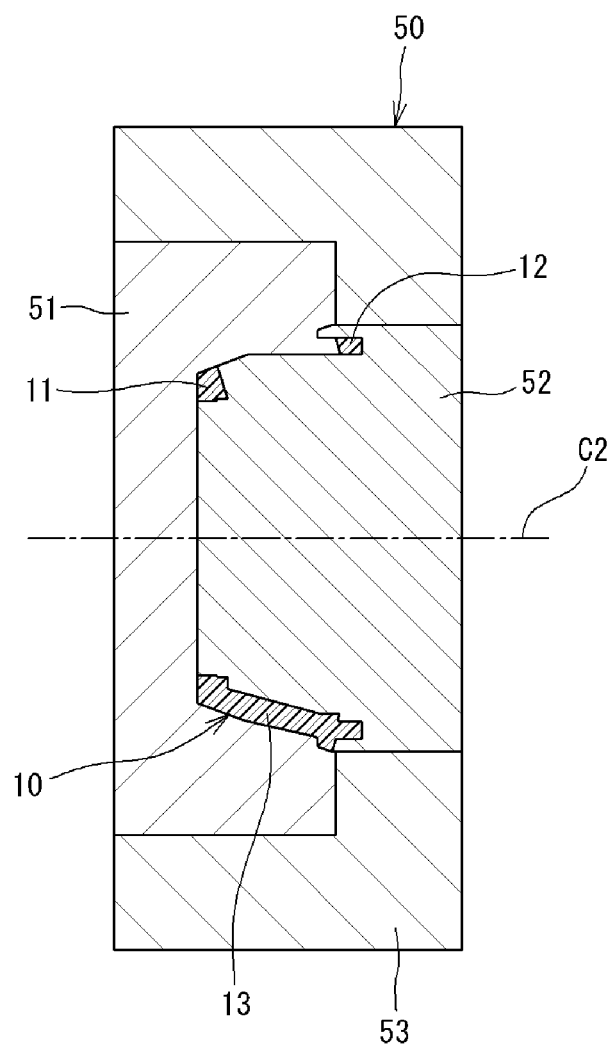
FIG. 15 is a longitudinal sectional view of a half-split mold and the cage.

Since the cage 10 is made of a resin, molding is performed by injecting a molten resin to a cavity of the mold and hardening the molten resin. In addition, the manufacturing of the cage 10 is performed by the injection molding. In the embodiment, as illustrated in FIG. 15, the cage 10 has a configuration in which the molding is possible using a half-split mold 50 including a first mold 51 that moves to one side along a center line C2 of the cage 10 and a second mold 52 that moves to the other side along the center line C2. In addition, the cavity for molding the cage 10 is formed between the first mold 51 and the second mold 52, but an annular mold 53 which is externally fitted to the first mold 51 and the second mold 52 is also provided in the mold 50.

In a state where the first mold 51 and the second mold 52 are relatively moved along the center line C2 and are allowed to approach each other, and are further assembled on the inner side of the annular mold 53, the molten resin is injected into the cavity, cooled, and hardened. In addition, by relatively moving the first mold 51 and the second mold 52 along the center line C2 and making the first mold 51 and the second mold 52 separated from each other, the mold of the cage 10 which is a molded article is removed.

In this manner, in order to use the mold that configures the cavity as the two-split molds (51 and 52), when the molds 51 and 52 are separated and removed, it is necessary that the molded article is configured in which a so-called forced extraction is not generated, and the cage 10 of the embodiment is configured in this manner.

Figure 16:
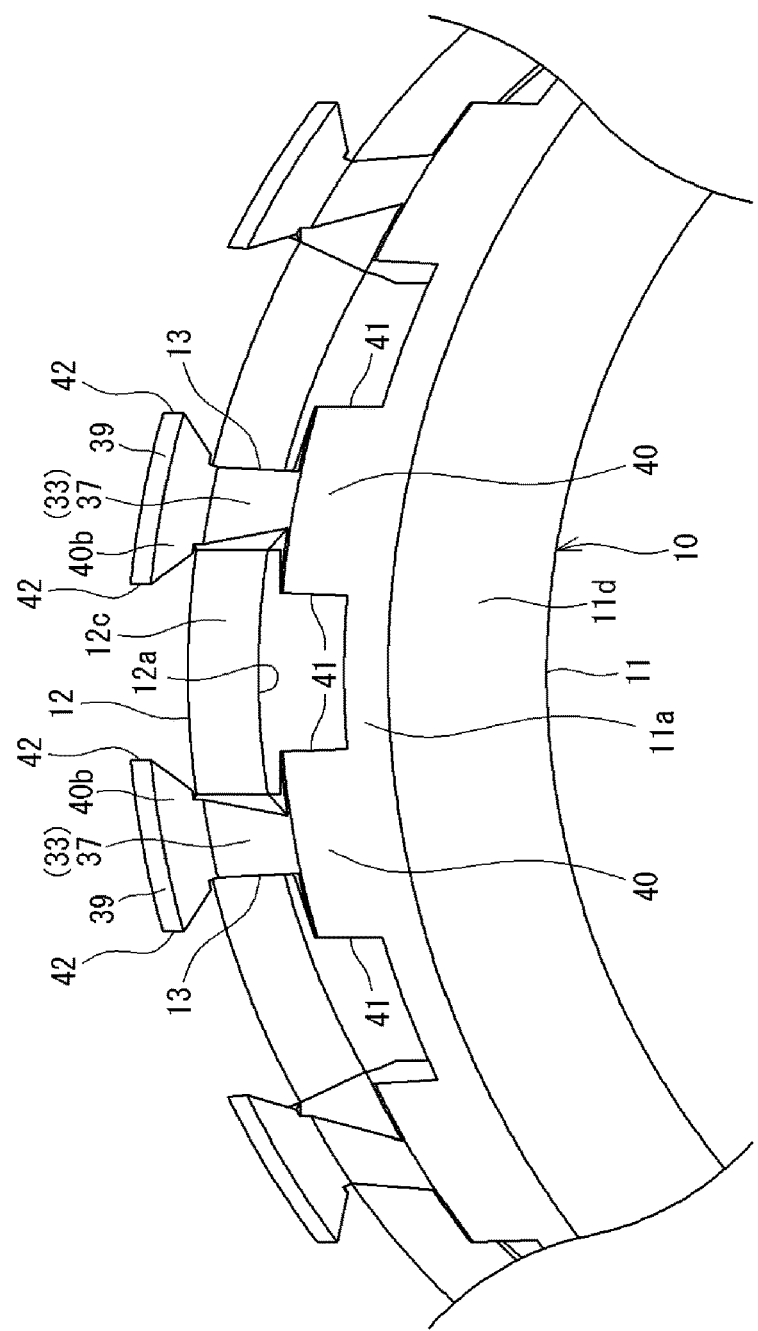
FIG. 16 is a front view of a part of the cage viewed from one axial side.
Figure 17:
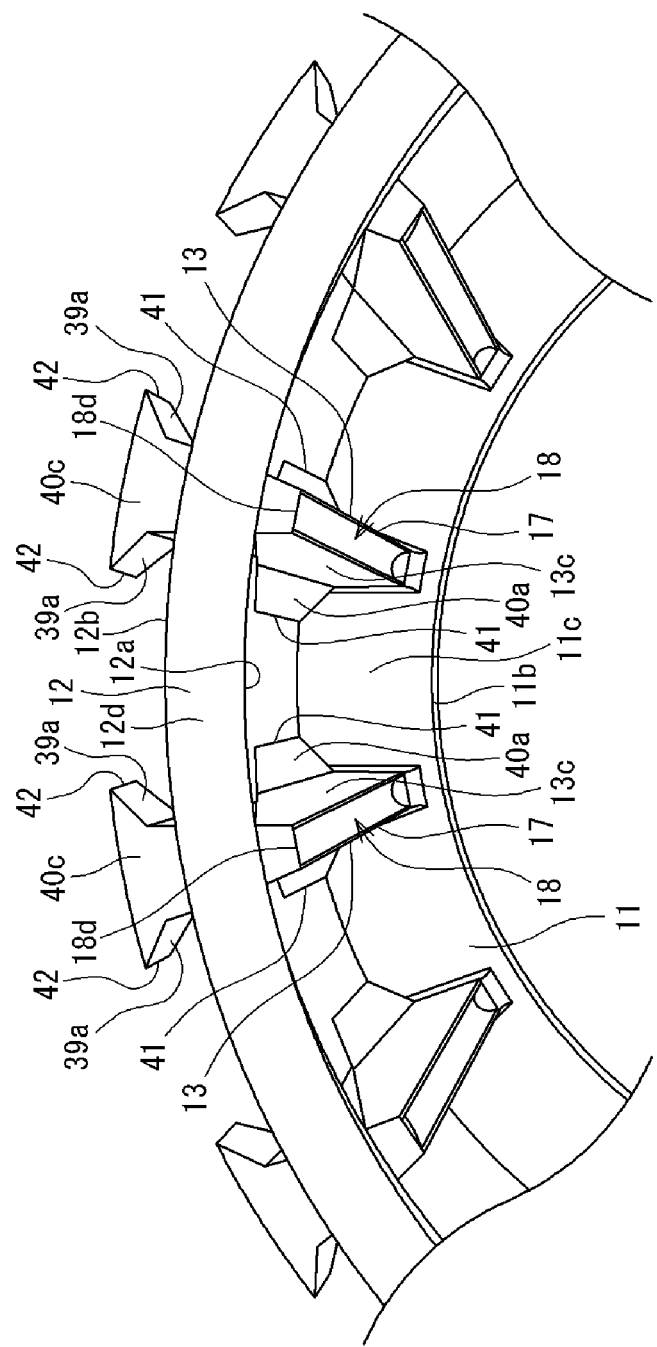
FIG. 17 is a rear view of a part of the cage viewed from the other axial side.

Specifically speaking, the cage 10 is configured of the small-diameter annular portion 11, the large-diameter annular portion 12, and the plurality of column portions 13, and the surface of the entire cage including the small-diameter annular portion 11, the large-diameter annular portion 12, and all of the column portions 13, is configured by aggregating a surface viewed from one axial side (refer to FIG. 16) and a surface viewed from the other axial side (refer to FIG. 17). In other words, each surface of the cage 10 is configured to be necessarily seen from one axial side or the other axial side. FIG. 16 is a view (front view) of a part of the cage 10 viewed from one axial side parallel to the center line C2 of the cage 10, and FIG. 17 is a view (rear view) of a part of the cage 10 viewed from the other axial side parallel to the center line C2 of the cage 10.

The next surface is included in the surface of the entire cage.

In the small-diameter annular portion 11, the outer circumferential surface 11a, the inner circumferential surface 11b, the axial inner surface 11c, and an axial outer surface 11d are included. In the large-diameter annular portion 12, an outer circumferential surface 12b, the inner circumferential surface 12a, the axial inner surface 12c, and an axial outer surface 12d are included.

In the column portion 13, the radial inner surface 17, a radial outer surface 37, and the side surfaces 13c on both sides are included. In the first roller retaining portion 41 in the column portion 13, the slide contact surface 40 on the small-diameter annular portion 11 side and a rear surface 40a of the slide contact surface 40 are included. In addition, in the second roller retaining portion 42, the slide contact surface 39 on the large-diameter annular portion 12 side, a rear surface 39a of the slide contact surface 39, a surface 40b on one axial side, and a surface 40c on the other axial side.

Here, as illustrated in FIG. 16, when the cage 10 is viewed from one axial side, the outer circumferential surface 11a and the axial outer surface 11d of the small-diameter annular portion 11 are viewed, the axial inner surface 12c of the large-diameter annular portion 12 is viewed, and the radial outer surface 37 of the column portion 13 is viewed. Furthermore, the slide contact surface 40 of the first roller retaining portion 41 is viewed, and the surface 40b and the slide contact surface 39 on one axial side of the second roller retaining portion 42 is viewed. Since the inner circumferential surface 12a of the large-diameter annular portion 12 is formed on the circular surface of which the diameter is greater than that of the outer circumferential surface 11a of the small-diameter annular portion 11, the entire axial inner surface 12c is deservedly viewed.

Meanwhile, as illustrated in FIG. 17, when the cage 10 is viewed from the other axial side, the inner circumferential surface 11b and the axial inner surface 11c of the small-diameter annular portion 11 are viewed, the outer circumferential surface 12b, the inner circumferential surface 12a, and the axial outer surface 12d of the large-diameter annular portion 12 are viewed, and the radial inner surface 17 of the column portion 13 and the side surfaces 13c on both sides are viewed. Furthermore, when the rear surface 40a of the first roller retaining portion 41 is viewed, the rear surface 39a of the second roller retaining portion 42 and the surface 40c on the other axial side are viewed.

In FIG. 17, in particular, the groove 18 is formed on the radial inner surface 17 of the column portion 13, and all of the surfaces of the groove 18 are viewed from one axial side. In other words, since the radial inner surface 17 of the column portion 13 has a shape along the taper surface of which the diameter increases as approaching the other side from one axial side, the radial inner surface 17 is viewed from the other axial side. In addition, on the radial inner surface 17, the groove 18 which extends along the longitudinal direction of the column portion 13 and is open on the other axial side is formed, and the end portion (groove final end) 18d of the groove 18 is also viewed from the other axial side. In other words, in the embodiment, as described above, since the groove 18 has a shallow part 18e (refer to FIGS. 7 and 8) and the groove depth becomes zero at the groove final end (end portion 18d), the groove 18 is open on the other axial side. Therefore, the groove 18 is completely viewed from the other axial side.

In a case where the groove 18 is not open in the end portion on the other axial side, the inner surface of the part at which the opening is closed is not included in either the surface viewed from one axial side or the surface viewed from the other axial side, the axial movement of one mold (second mold 52) of the first mold 51 and the second mold 52 is inhibited by the part at which the opening is not closed, and the manufacturing of the cage 10 using the half-split mold becomes impossible.

However, according to the configuration of the groove 18 according to the embodiment, each portion of the entire groove 18 is viewed from the other axial side, and the manufacturing of the cage using the half-split mold becomes possible.

In addition, as described above (refer to FIG. 5), the radial inner surface 17 of the column portion 13 is provided along the second virtual taper surface J2 in the vicinity of (or being matched) the first virtual taper surface J1 including the center line C1 of the plurality of taper rollers 4 held by the pocket 14 across the entire length in the longitudinal direction of the column portion 13. Accordingly, when the taper roller bearing 1 rotates, the radial inner surface 17 of the column portion 13 can scrape the lubricating oil attached to the outer circumferential surface of the taper roller 4 across the entire length in the longitudinal direction of the column portion 13. Accordingly, it is possible to reduce rolling viscosity resistance and agitating resistance.

Figure 18:
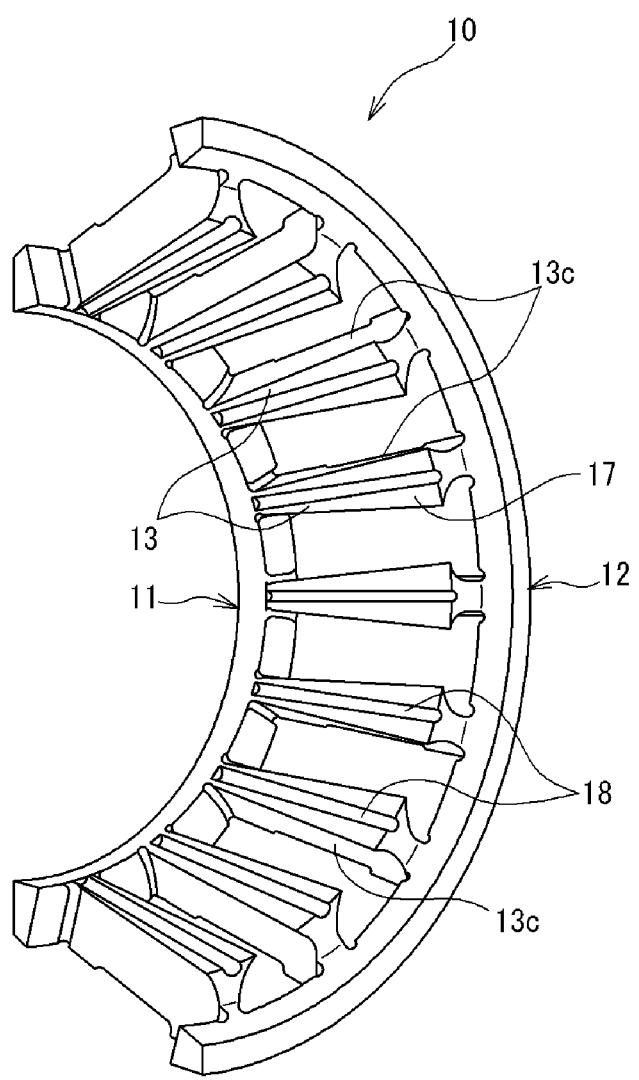
FIG. 18 is a perspective view of the cage in a case where a column portion is provided to be long in the radial direction.
Figure 19:
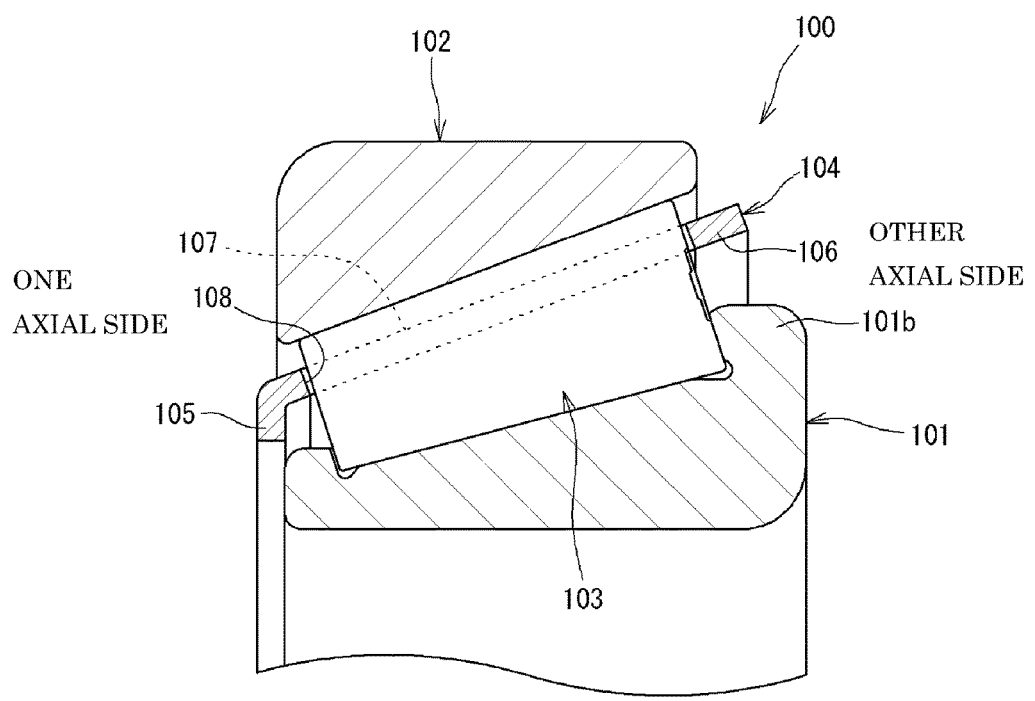
FIG. 19 is a longitudinal sectional view illustrating a taper roller bearing of the related art.

However, as illustrated in FIG. 18, in a case where the column portion 13 is configured to be long in the radial direction to a position at which the radial inner surface 17 of the column portion 13 is close to the inner ring, in order to scrape the lubricating oil attached to the outer circumferential surface of the taper roller by the radial inner surface 17 of the column portion 13, the radial inner surface 17 is supposed to have a shape which widens in the circumferential direction as illustrated in FIG. 18. However, in this case (refer to FIG. 18), at a part having a widening shape, a surface which is not included in either the surface viewed from one axial side or the surface viewed from the other axial side exists. In other words, in the embodiment (FIG. 17), the side surface 13c of the column portion 13 viewed from the other axial side is not viewed from the other axial side in the example of FIG. 18 (further, also not viewed from one axial side), and the manufacturing of the cage 10 illustrated in FIG. 18 is impossible using the half-split mold which moves to approach and be separated in the axial direction.

Here, as described in the embodiment, as the radial inner surface 17 of the column portion 13 is provided along the second virtual taper surface J2, it is possible to manufacture the cage 10 made of a resin using the half-split molds (51 and 52) while having a function of scraping the lubricating oil of the taper roller 4.

In addition, as described above, in order to flow the lubricating oil in the vicinity of the inner circumferential surface 3b of the outer ring 3 between the pockets 14 and 14 adjacent to each other and weaken agitating resistance of the lubricating oil, the recess portion 33 is formed on the radial outer side of the column portion 13 (refer to FIG. 5). Here, in the recess portion 33, the depth of the end 33a on one axial side is zero and the bottom surface of the recess portion 33 has a shape of an inclined surface that is inclined as approaching the radial outer side toward the other axial side.

Accordingly, even when the recess portion 33 is formed on the radial outer side of the column portion 13, the molding using the half-split molds (51 and 52) is maintained. In other words, by configuring the recess portion 33 in this manner, the entire recess portion 33 becomes a surface viewed from one axial side (refer to FIG. 16). Therefore, in the recess portion 33, the first mold 51 can move to one axial side without forced extraction.

Above, as the surface of the entire cage is configured by aggregating the surface viewed from one axial side (refer to FIG. 16) and the surface viewed from the other axial side (refer to FIG. 17), it is possible to manufacture the cage 10 made of a resin using the half-split molds that configure the cavity by the first mold 51 which moves to one axial side and the second mold 52 which moves to the other axial side. As a result, mass productivity of the cage 10 is improved.

In addition, although not being illustrated, the cage 10 of the embodiment illustrated in FIG. 2 may also use a third mold which moves in the radial direction for forming the pocket other than the first and the second molds which relatively move in the axial direction. However, in this case, a split surface of the mold increases, management of dimension accuracy of the cage become difficult, and there is a possibility that accuracy of the cage 10 deteriorates. In addition, life of the mold is shortened. However, according to the half-split mold 50 illustrated in FIG. 15, the split surface decreases, it becomes possible to manufacture the cage 10 with high accuracy, and it is possible to prevent deterioration of life of the mold.

The embodiments disclosed above are merely examples in all aspects and are not limited thereto. In other words, the taper roller bearing of the present invention may be another aspect within the range of the present invention not being limited to the aspects illustrated in the drawings.

INDUSTRIAL APPLICABILITY

According to the present invention, it is possible to reduce rotation torque of the taper roller bearing, and accordingly, it is possible to reduce energy loss in an apparatus in which the taper roller bearing is used.

REFERENCE SIGNS LIST

1: TAPER ROLLER BEARING
2: INNER RING
3: OUTER RING
4: TAPER ROLLER
5: SMALL FLANGE
5a: OUTER CIRCUMFERENTIAL SURFACE
6: LARGE FLANGE
6a: OUTER CIRCUMFERENTIAL SURFACE
8: SHAFT
9: CIRCULAR PORTION
10: CAGE
11: SMALL-DIAMETER ANNULAR PORTION
11a: OUTER CIRCUMFERENTIAL SURFACE
11b: INNER CIRCUMFERENTIAL SURFACE
12: LARGE-DIAMETER ANNULAR PORTION
12a: INNER CIRCUMFERENTIAL SURFACE
12c: AXIAL INNER SURFACE
13: COLUMN PORTION
14: POCKET
15: CUT-OUT PORTION
16: CAVITY PORTION
16a: RADIAL OUTER END PORTION
17: RADIAL INNER SURFACE
18: GROOVE
18e: SHALLOW PART
21: FIRST INNER CIRCUMFERENTIAL SURFACE PORTION
22: SECOND INNER CIRCUMFERENTIAL SURFACE PORTION
24: FIRST OUTER CIRCUMFERENTIAL SURFACE PORTION
25: SECOND OUTER CIRCUMFERENTIAL SURFACE PORTION
26: FIRST INNER CIRCUMFERENTIAL SURFACE PORTION
27: SECOND INNER CIRCUMFERENTIAL SURFACE PORTION
29: FIRST OUTER CIRCUMFERENTIAL SURFACE PORTION
30: SECOND OUTER CIRCUMFERENTIAL SURFACE PORTION
33: RECESS PORTION
33a: END
33b: BOTTOM SURFACE
40: SLIDE CONTACT SURFACE
41: FIRST ROLLER RETAINING PORTION
41a: ARC SURFACE PORTION
42: SECOND ROLLER RETAINING PORTION
A1: ANNULAR OPENING PORTION
A2: ANNULAR OPENING PORTION
C1: CENTER LINE
J1: FIRST VIRTUAL TAPER SURFACE

J2: SECOND VIRTUAL TAPER SURFACE
J3: VIRTUAL EXTENDING LINE
K0: RADIAL CLEARANCE
K2-1: FINE CLEARANCE
K2-2: FINE CLEARANCE
K3-1: FINE CLEARANCE
K3-2: FINE CLEARANCE
K10: RADIAL CLEARANCE

The invention claimed is:

1. A taper roller bearing comprising:
an inner ring that includes a small flange that is positioned on a first side in an axial direction and that protrudes to an outer side in a radial direction, and a large flange that is positioned on a second side in the axial direction and that protrudes to the outer side in the radial direction;
an outer ring that is positioned on the outer side in the radial direction of the inner ring;
a plurality of taper rollers that are positioned between the inner ring and the outer ring; and
an annular cage that holds the plurality of taper rollers at an interval in the circumferential direction,
wherein:
the cage includes a small-diameter annular portion that is disposed on one side of the cage, a large-diameter annular portion that is disposed on an opposite side of the cage, and a plurality of column portions that link the small-diameter annular portion and the large-diameter annular portion with each other,
an inner circumferential surface of the small-diameter annular portion includes a first inner circumferential surface portion and a second inner circumferential surface portion having a diameter that is smaller than a diameter of the first inner circumferential surface portion, the first inner circumferential surface portion and the second inner circumferential surface portion being continuous with each other via an annular surface such that the annular surface is disposed at an inner side of an end surface of the inner ring toward the axial direction, and
an outer circumferential surface of the small flange includes a first outer circumferential surface portion opposing to the first inner circumferential surface portion with a first fine clearance, and a second outer circumferential surface portion having a diameter that is smaller than a diameter of the first outer circumferential surface portion and opposing to the second inner circumferential surface portion with a second fine clearance.

2. The taper roller bearing according to claim 1, wherein a diameter of the second inner circumferential surface portion is set to be larger than an outer diameter of a circular portion positioned in a shaft to which the inner ring is externally fitted, which is a value based on the ISO standard.

3. The taper roller bearing according to claim 1, wherein a minimum length of the first fine clearance is greater than a minimum length of the second fine clearance.

4. A taper roller bearing comprising:
an inner ring that includes a small flange that is positioned on a first side in an axial direction and that protrudes to an outer side in a radial direction and a large flange that is positioned on a second side in the axial direction and that protrudes to the outer side in the radial direction;
an outer ring that is positioned on the outer side in the radial direction of the inner ring;
a plurality of taper rollers that are positioned between the inner ring and the outer ring; and
an annular cage that holds the plurality of taper rollers at an interval in the circumferential direction,
wherein:
the cage includes a small-diameter annular portion that is positioned on one side of the cage and on the outer side in the radial direction of the small flange, a large-diameter annular portion that is positioned on an opposite side of the cage, and a plurality of column portions that link the small-diameter annular portion and the large-diameter annular portion with each other, and
a clearance in the radial direction between the small flange and the small-diameter annular portion is set to be a negative clearance or a zero clearance.

5. The taper roller bearing according to claim 4, wherein the small-diameter annular portion is made of a material having wear resistance lower than that of the small flange.

6. The taper roller bearing according to claim 4, wherein an outer circumferential surface of the small flange is a corrugated surface.

7. A taper roller bearing comprising:
an inner ring that includes a small flange that is positioned on a first axial side and that protrudes to an outer side in a radial direction and a large flange that is positioned on a second axial side and that protrudes to the outer side in the radial direction;
an outer ring that is positioned on the outer side in the radial direction of the inner ring;
a plurality of taper rollers that are positioned between the inner ring and the outer ring; and
an annular cage that holds the plurality of taper rollers at an interval in the circumferential direction,
wherein:
the cage includes a small-diameter annular portion that is positioned on one side of the cage, a large-diameter annular portion that is positioned on an opposite side of the cage and on the outer side in the radial direction of the large flange, and a plurality of column portions that link the small-diameter annular portion and the large-diameter annular portion with each other, and
a clearance in the radial direction between the large flange and the large-diameter annular portion is set to be a negative clearance or a zero clearance.

* * * * *